(12) United States Patent
Cho et al.

(10) Patent No.: US 11,314,346 B2
(45) Date of Patent: Apr. 26, 2022

(54) VEHICLE CONTROL DEVICE AND VEHICLE CONTROL METHOD

(71) Applicant: LG ELECTRONICS INC., Seoul (KR)

(72) Inventors: Jaehoon Cho, Seoul (KR); Heejeong Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 336 days.

(21) Appl. No.: 16/483,325

(22) PCT Filed: Nov. 30, 2018

(86) PCT No.: PCT/KR2018/015150
§ 371 (c)(1),
(2) Date: Aug. 2, 2019

(87) PCT Pub. No.: WO2020/111350
PCT Pub. Date: Jun. 4, 2020

(65) Prior Publication Data
US 2021/0333900 A1 Oct. 28, 2021

(51) Int. Cl.
G06F 3/041 (2006.01)
G06F 3/045 (2006.01)
(Continued)

(52) U.S. Cl.
CPC .............. *G06F 3/041* (2013.01); *B60K 35/00* (2013.01); *G06F 3/013* (2013.01);
(Continued)

(58) Field of Classification Search
CPC .............................. G06F 3/167; G06F 3/0482
See application file for complete search history.

(56) References Cited

U.S. PATENT DOCUMENTS

2005/0024494 A1* 2/2005 Hirota ...................... B60R 1/00
348/148
2005/0253818 A1* 11/2005 Nettamo ............... G06F 3/0488
345/173
(Continued)

FOREIGN PATENT DOCUMENTS

EP 3 339 078 A1 6/2018
JP 2007-212342 A 8/2007
(Continued)

*Primary Examiner* — Nan-Ying Yang
(74) *Attorney, Agent, or Firm* — Birch, Stewart, Kolasch & Birch, LLP

(57) ABSTRACT

Disclosed herein is a control device. The control device includes an interface unit physically connected to a display unit, a control board receiving an input of an occupant, and a camera capturing an image of an area of a body of the occupant and the surroundings of the control board, and a processor exchanging information with the control board, the display unit, and the camera through the interface unit, wherein if it is determined that the occupant is present in the driver's seat through the camera and a first input is received from the occupant through the control board, the processor controls the display unit to display a display area corresponding to a position to which the first input is input on the control board, and when the display area is displayed in the display unit and a second input is received from the occupant through the control board, the processor selects or controls contents displayed in the display area.

17 Claims, 23 Drawing Sheets

(51) Int. Cl.
  *B60K 35/00* (2006.01)
  *G06F 3/01* (2006.01)
  *G06F 3/04845* (2022.01)
  *G06K 9/00* (2022.01)
  *H04N 7/18* (2006.01)

(52) U.S. Cl.
  CPC ..... *G06F 3/04845* (2013.01); *G06K 9/00838* (2013.01); *H04N 7/181* (2013.01); *B60K 2370/149* (2019.05); *B60K 2370/1438* (2019.05); *B60K 2370/1529* (2019.05); *B60K 2370/182* (2019.05); *B60K 2370/21* (2019.05); *B60K 2370/52* (2019.05)

(56) References Cited

U.S. PATENT DOCUMENTS

| | | | |
|---|---|---|---|
| 2013/0145297 A1* | 6/2013 | Ricci | G07C 5/008 715/765 |
| 2014/0282259 A1* | 9/2014 | Fujimura | G06F 3/0304 715/835 |
| 2018/0273050 A1 | 9/2018 | Tertoolen et al. | |

FOREIGN PATENT DOCUMENTS

| | | |
|---|---|---|
| JP | 2013-97513 A | 5/2013 |
| KR | 10-2016-0055704 A | 5/2016 |
| KR | 10-2016-0148958 A | 12/2016 |
| KR | 10-1709129 B1 | 2/2017 |
| KR | 10-2017-0104372 A | 9/2017 |
| KR | 10-2017-0107767 A | 9/2017 |
| WO | WO 2015/197803 A2 | 12/2015 |

\* cited by examiner

[Figure 1]
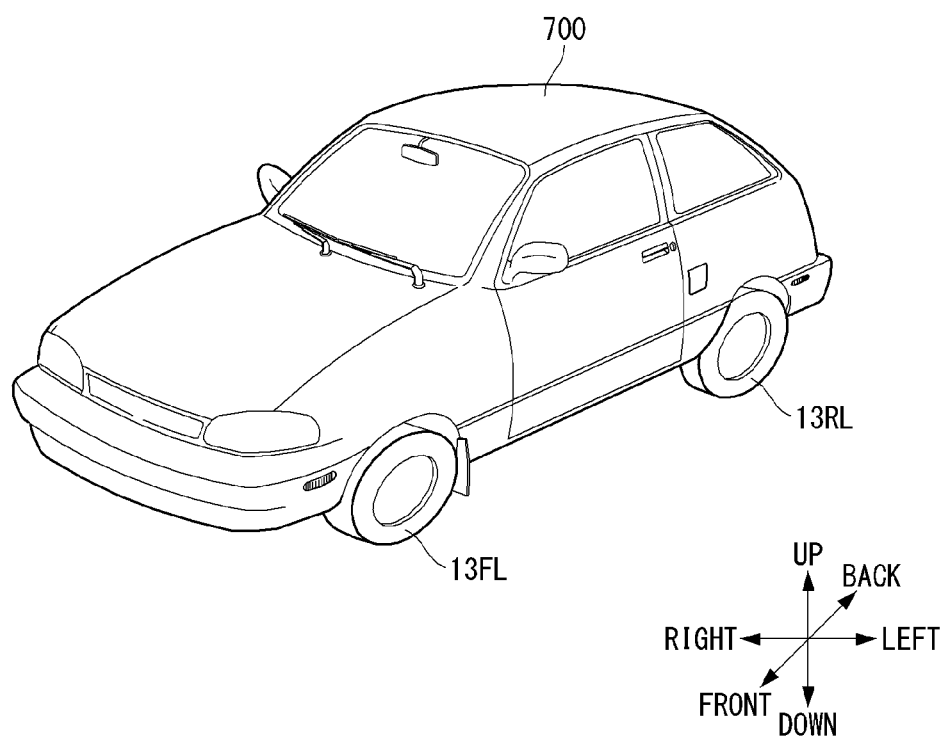

[Figure 2]
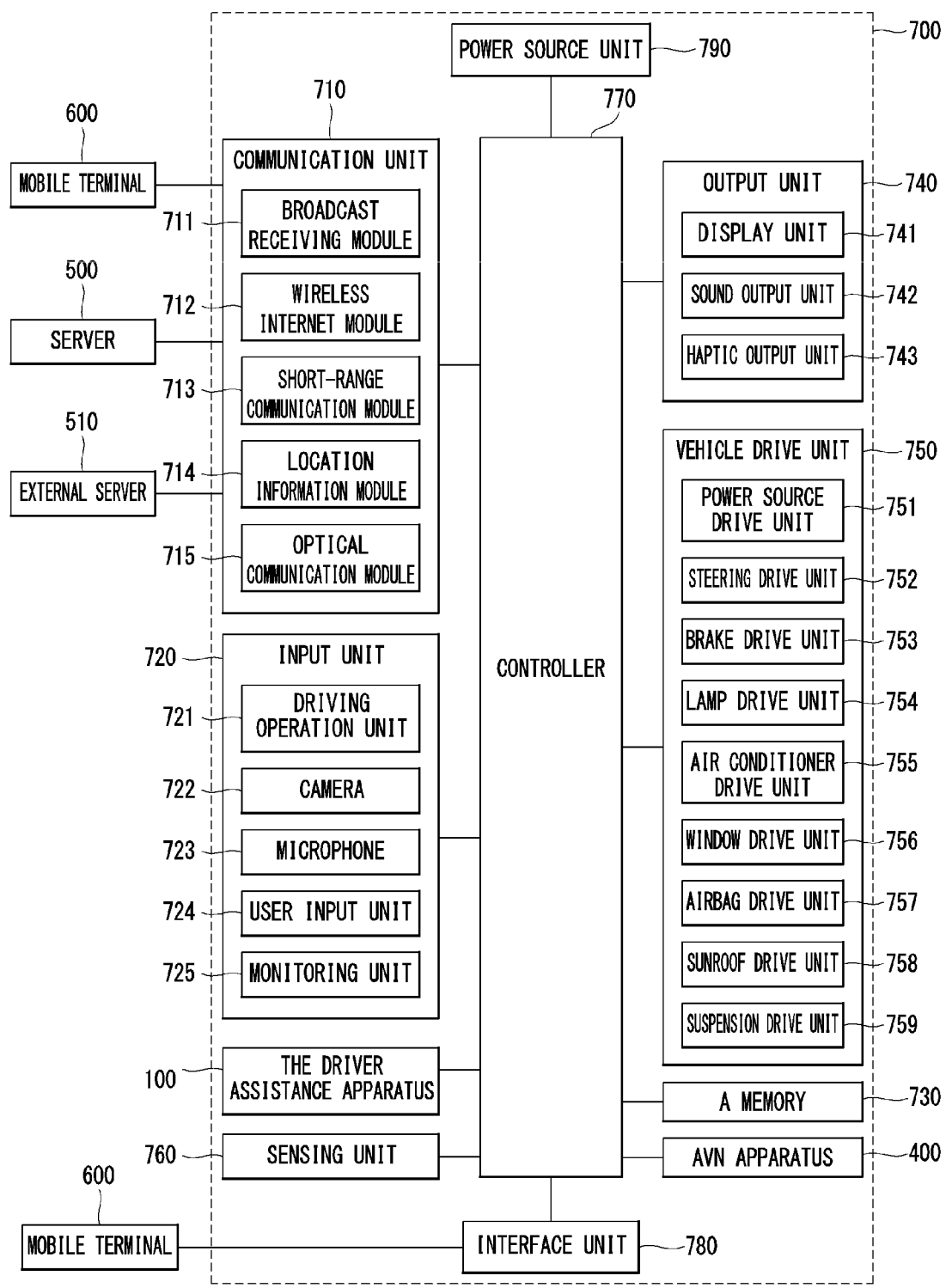

[Figure 3]
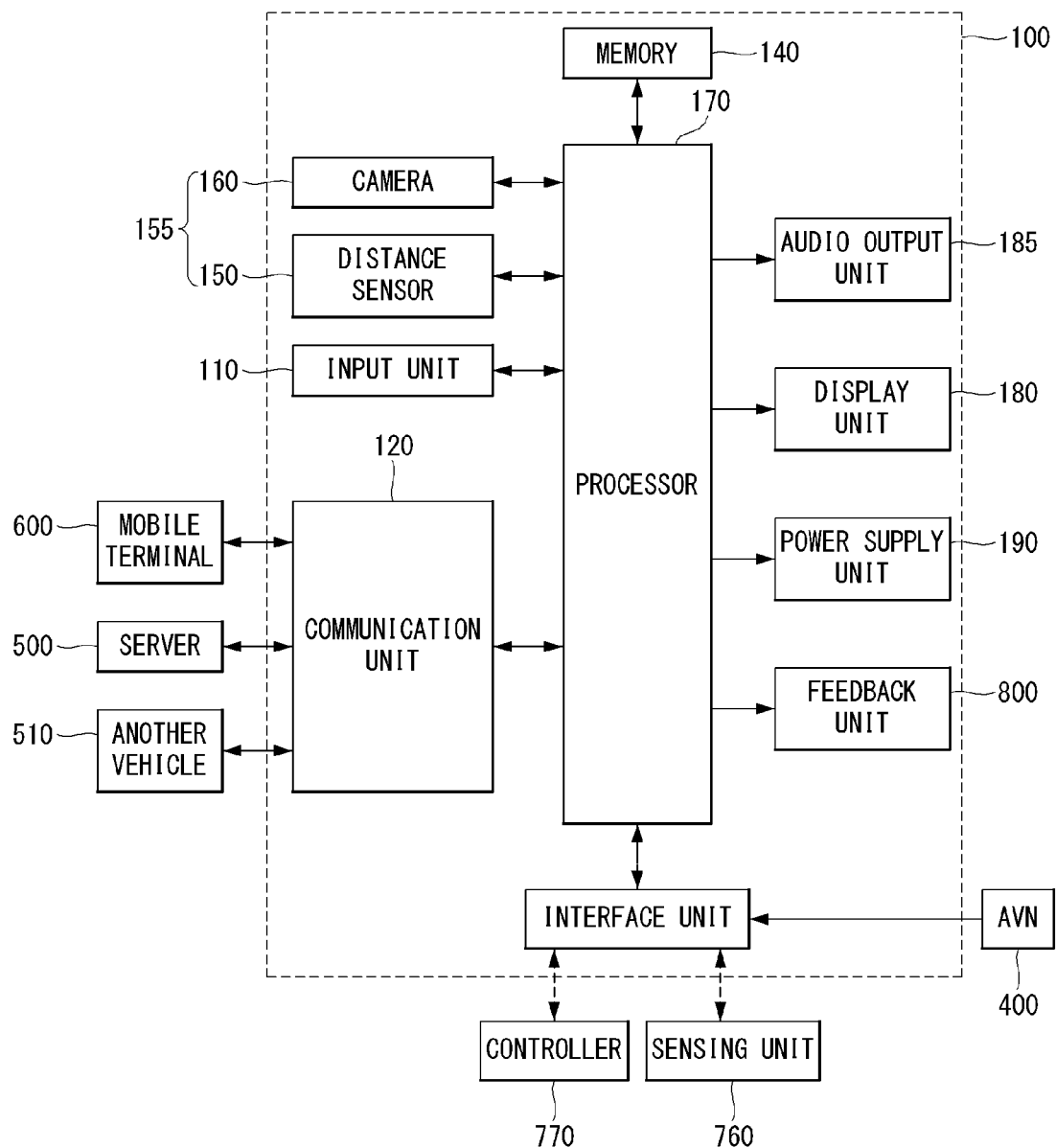

[Figure 4]
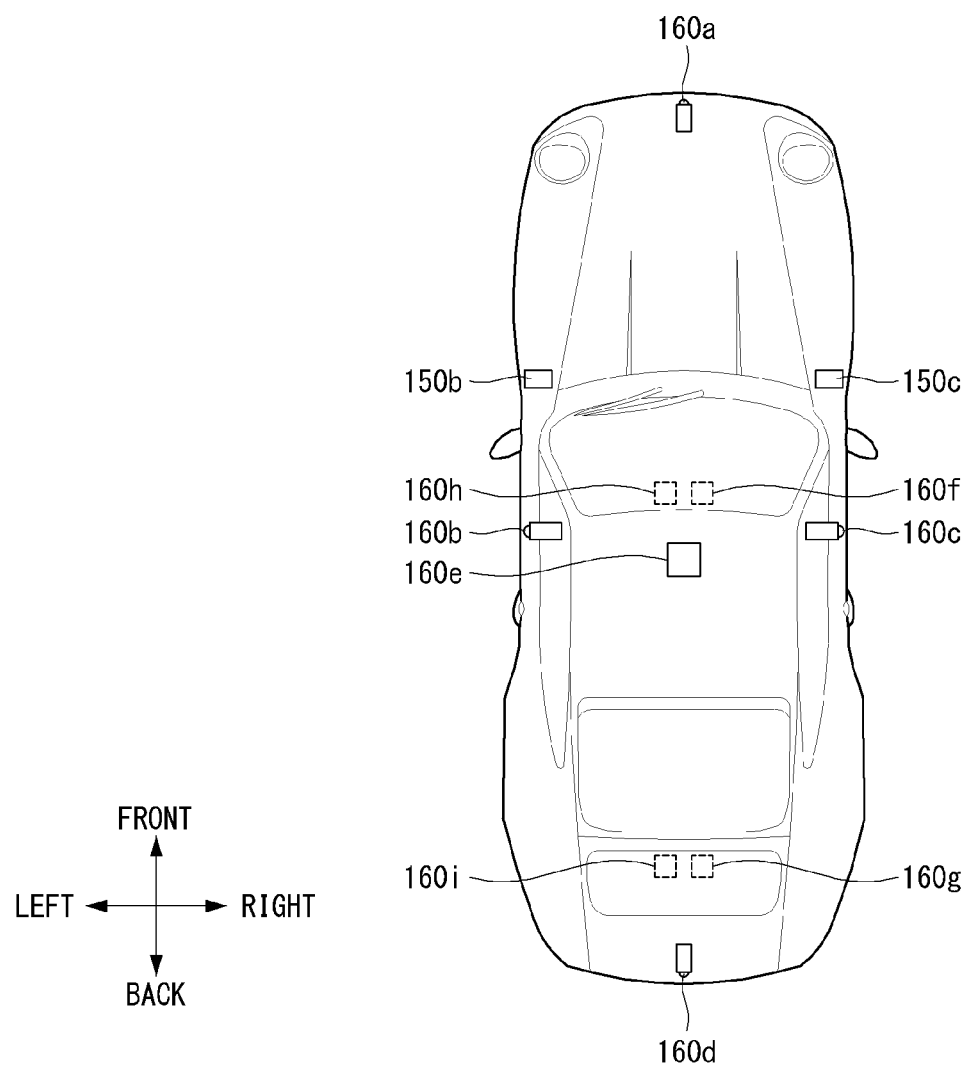

[Figure 5]
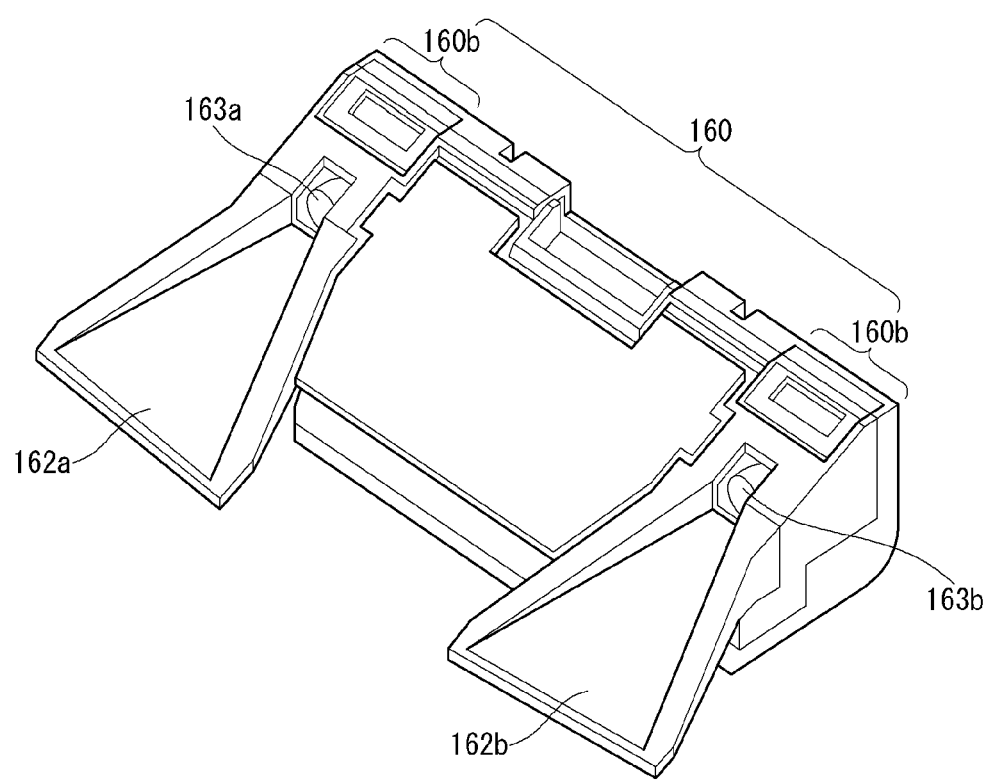

[Figure 6]
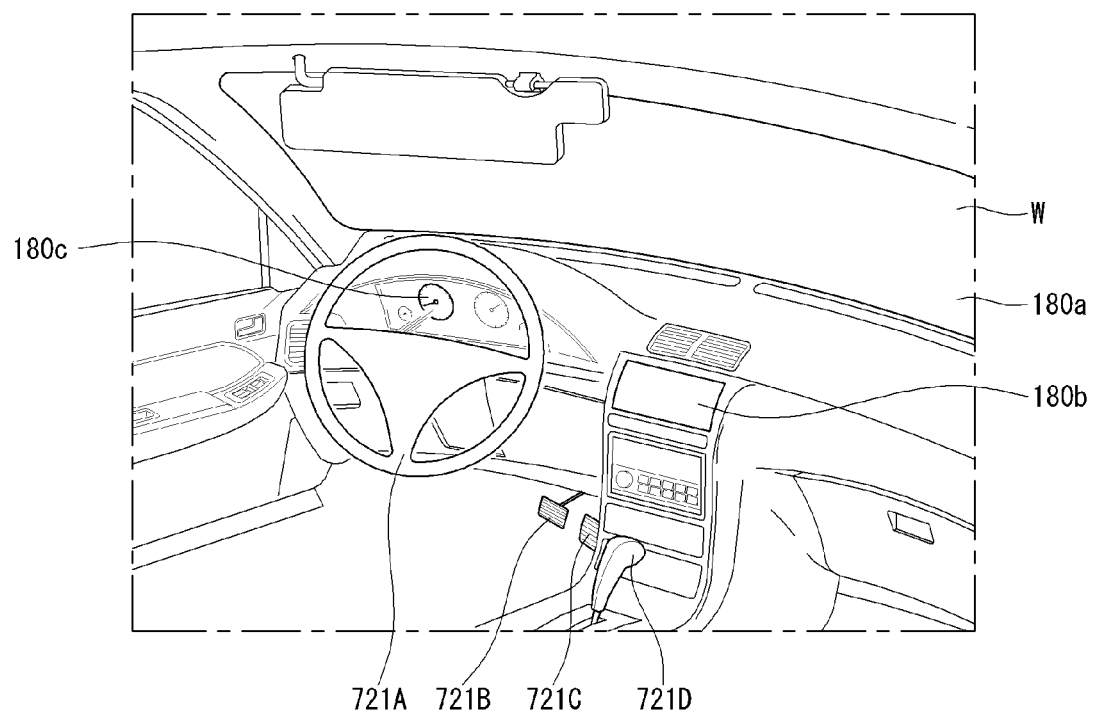

【Figure 7】
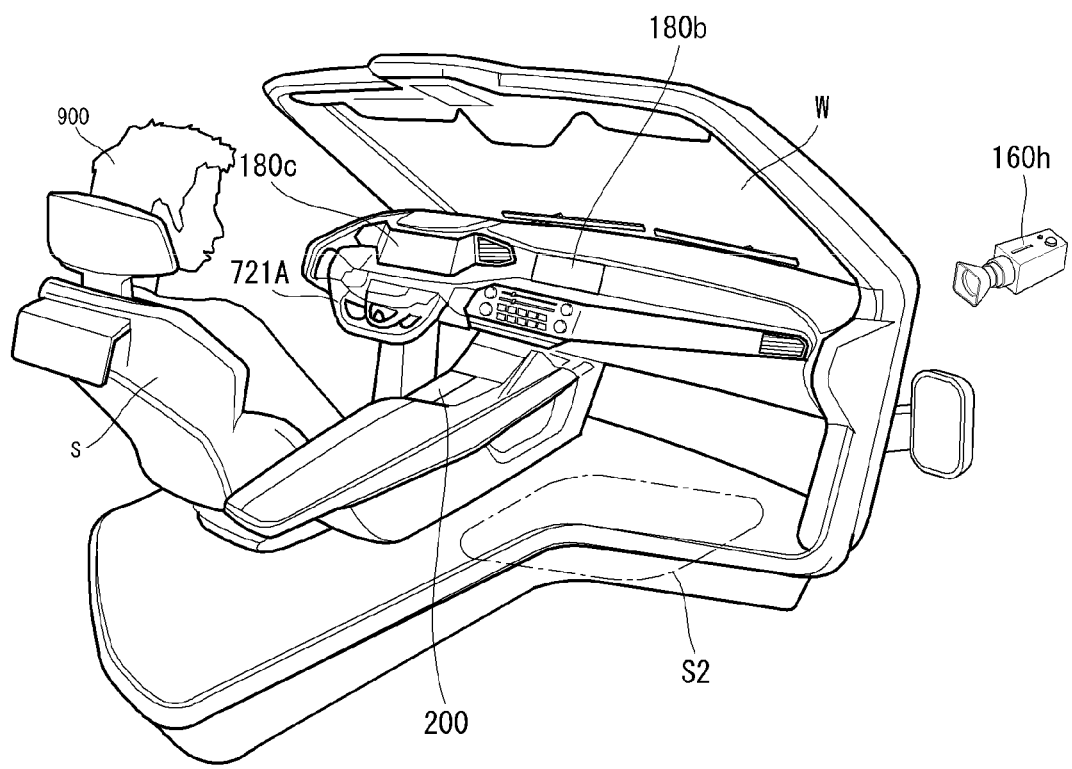

【Figure 8】
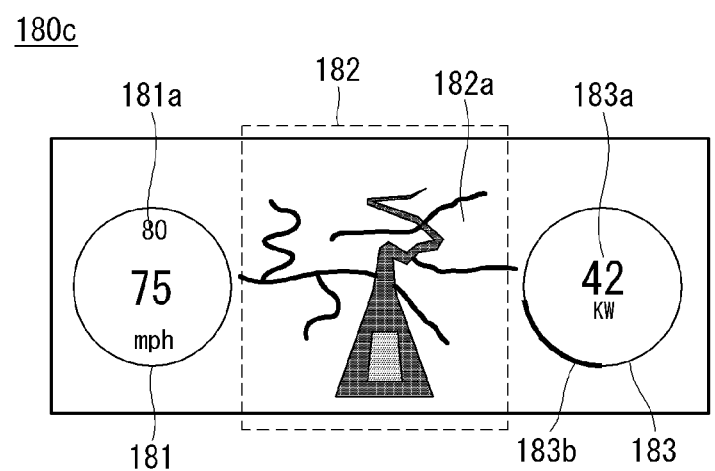

[Figure 9]
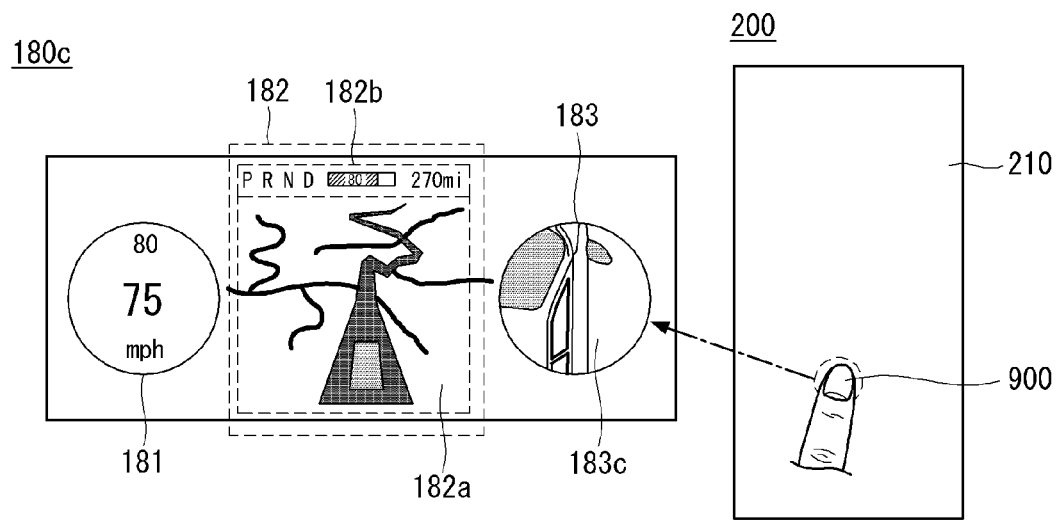

[Figure 10]
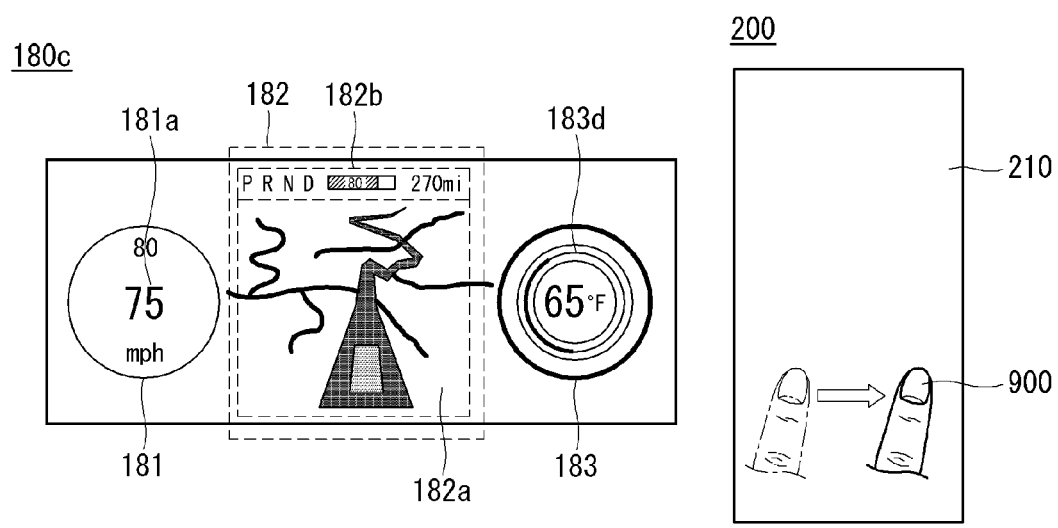

[Figure 11]
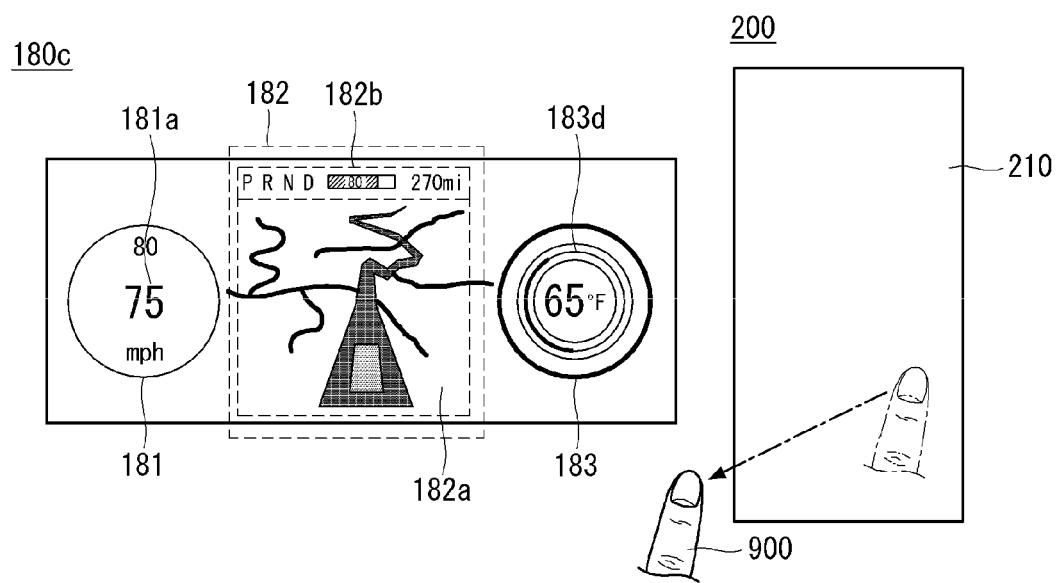

[Figure 12]
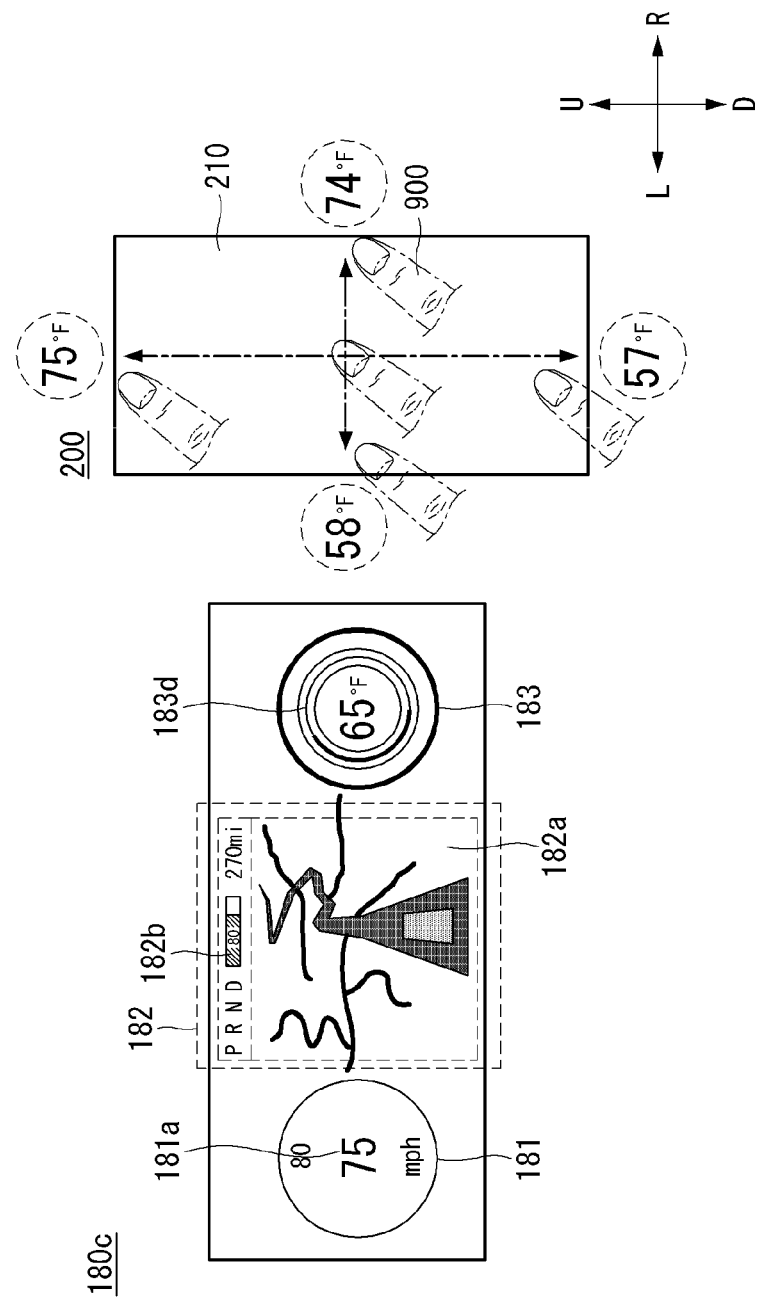

[Figure 13]
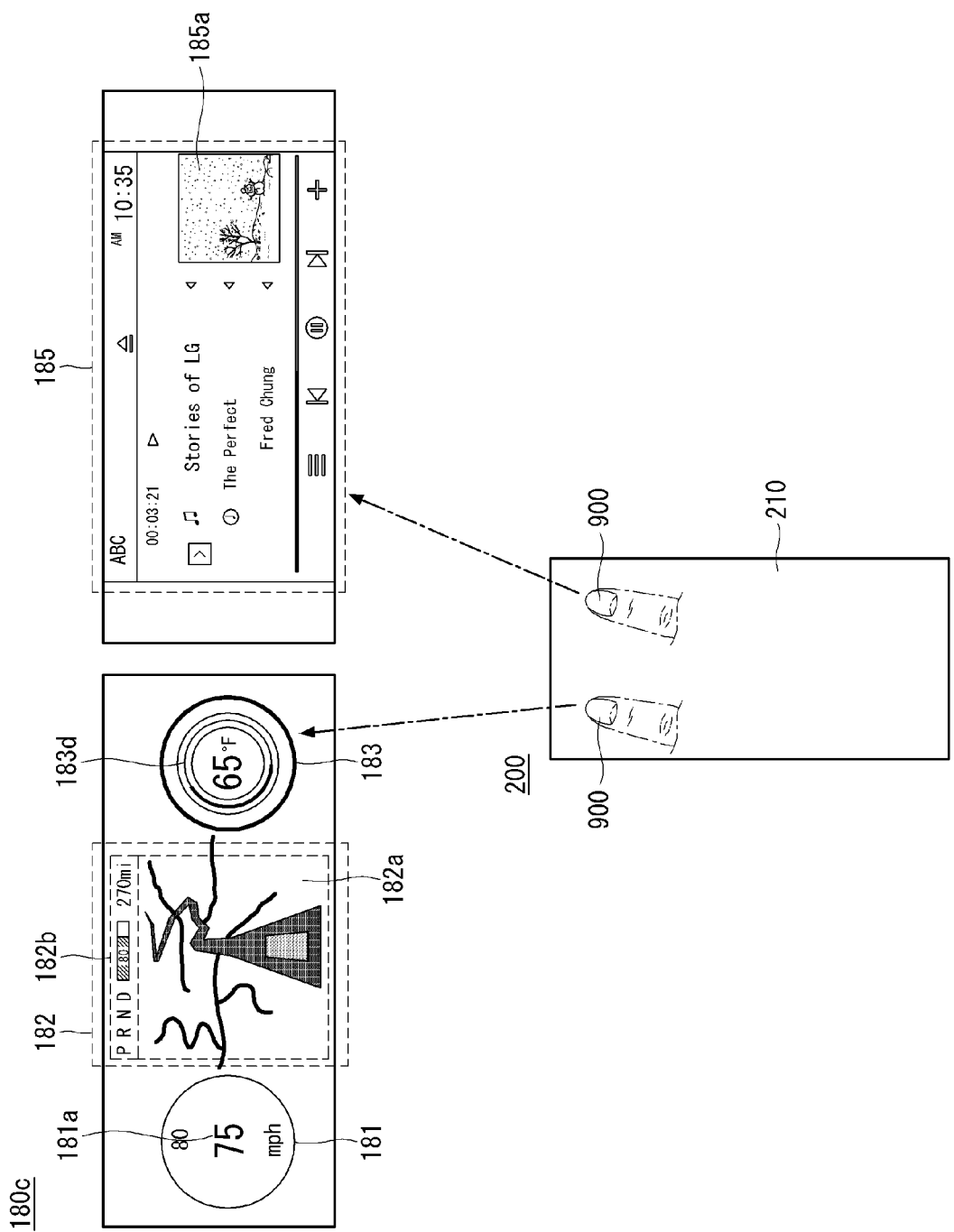

【Figure 14】
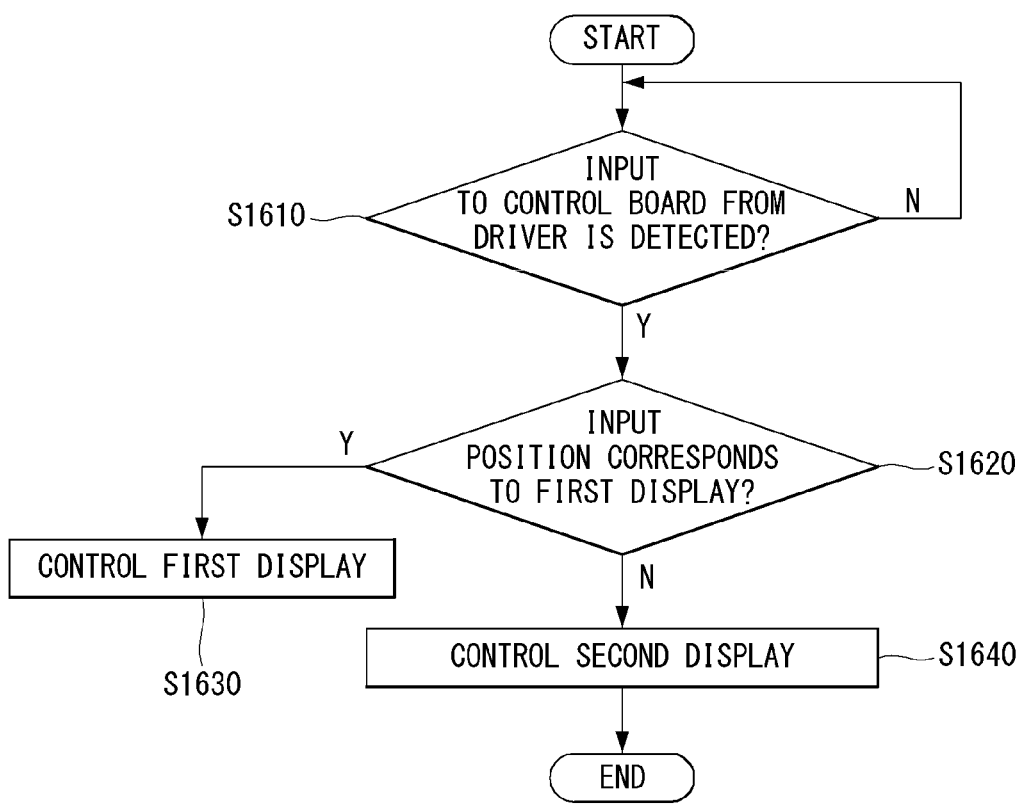

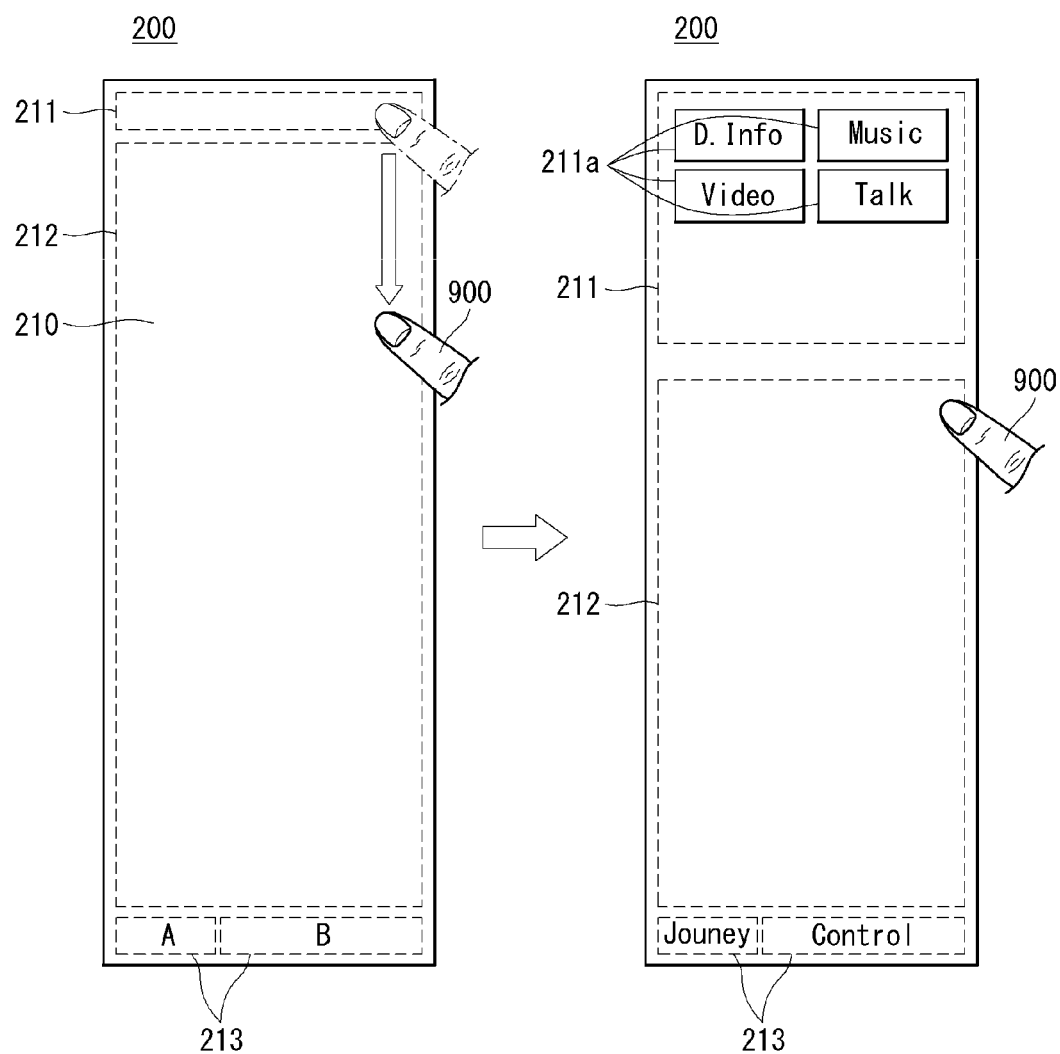
[Figure 15]

[Figure 16]
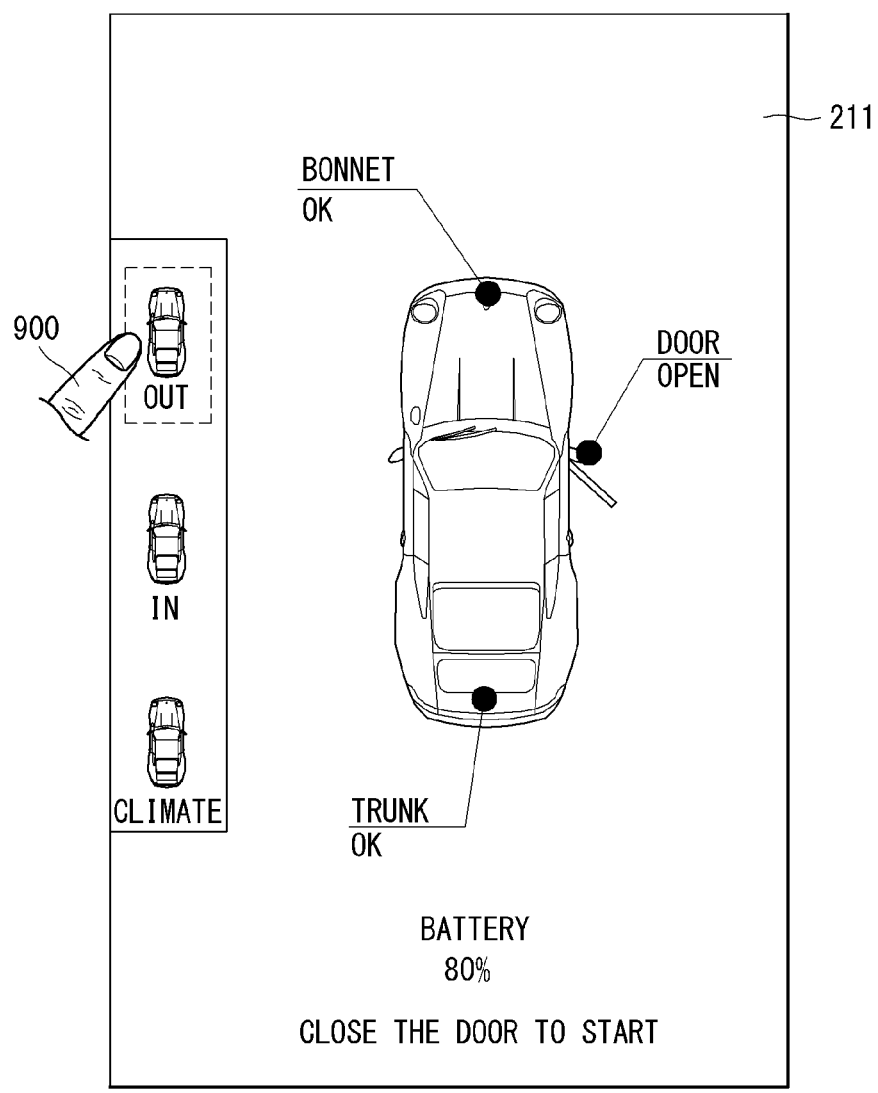

[Figure 17]
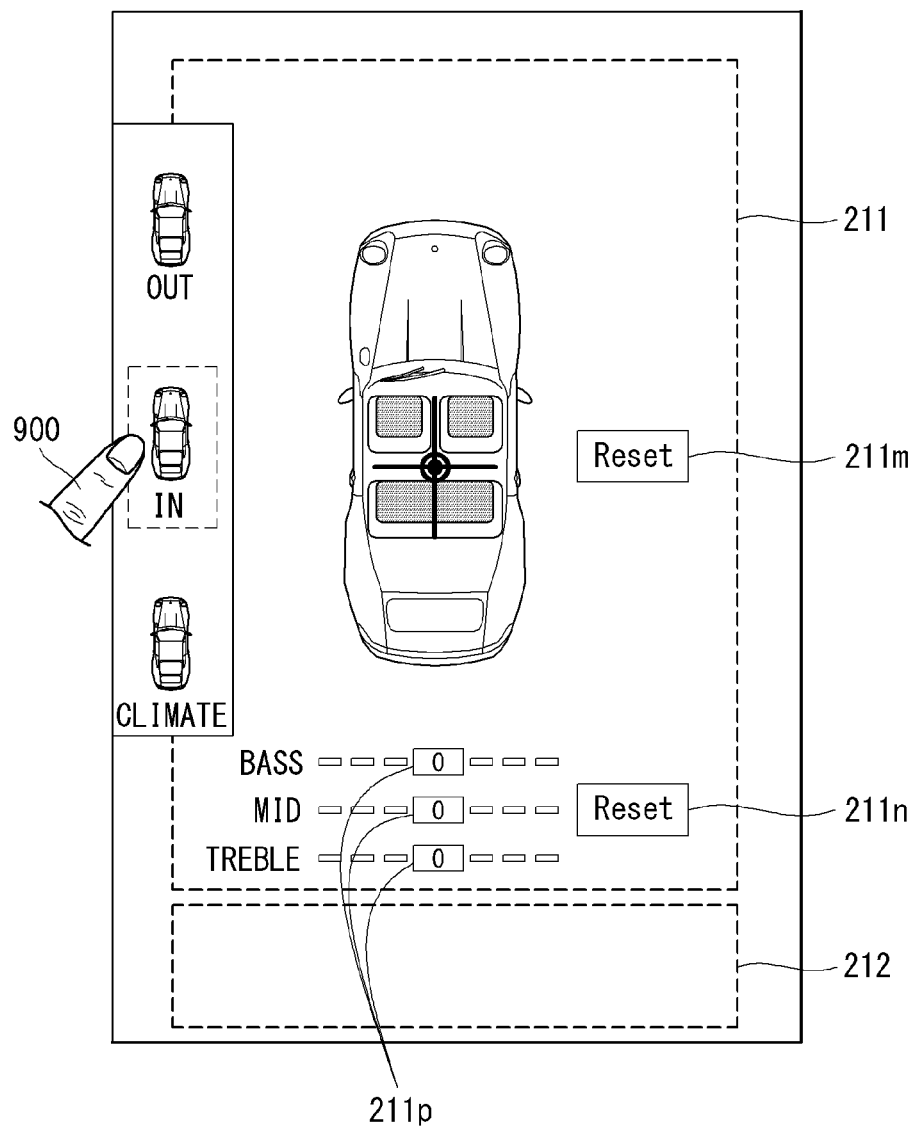

[Figure 18]
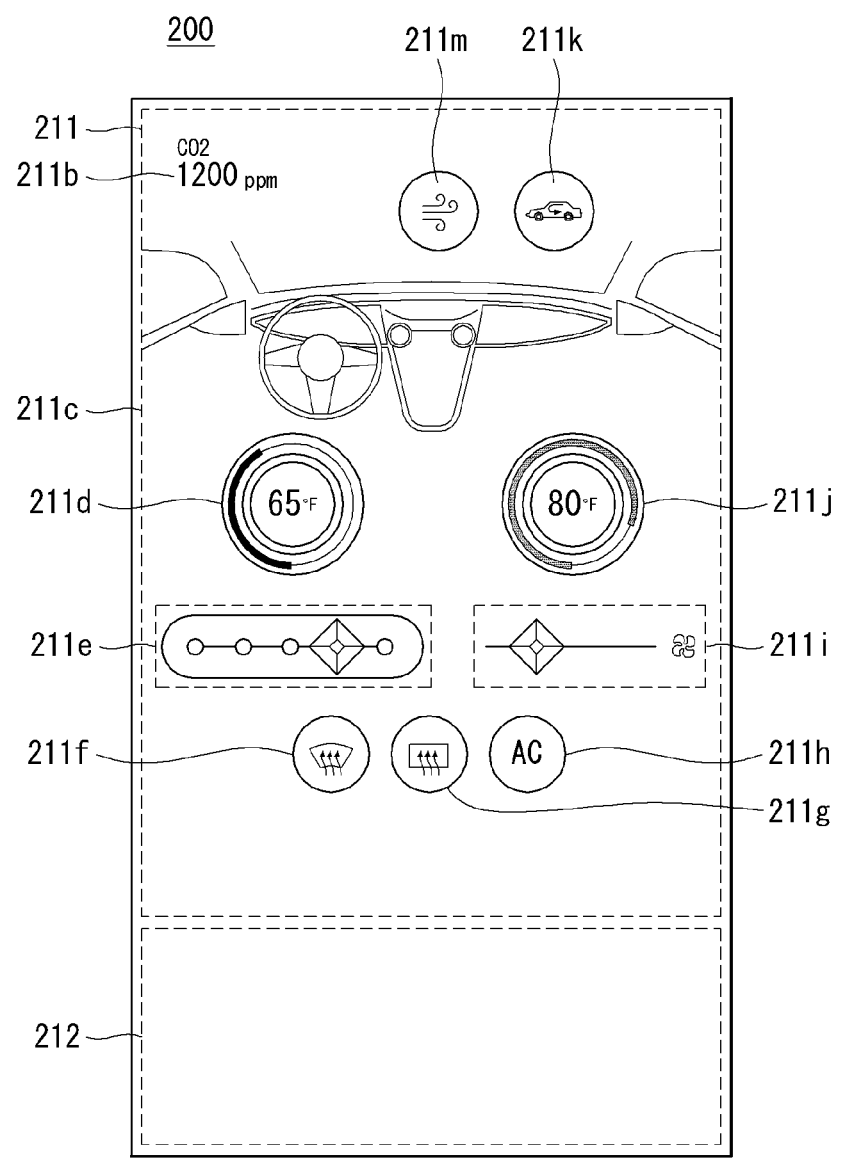

[Figure 19]
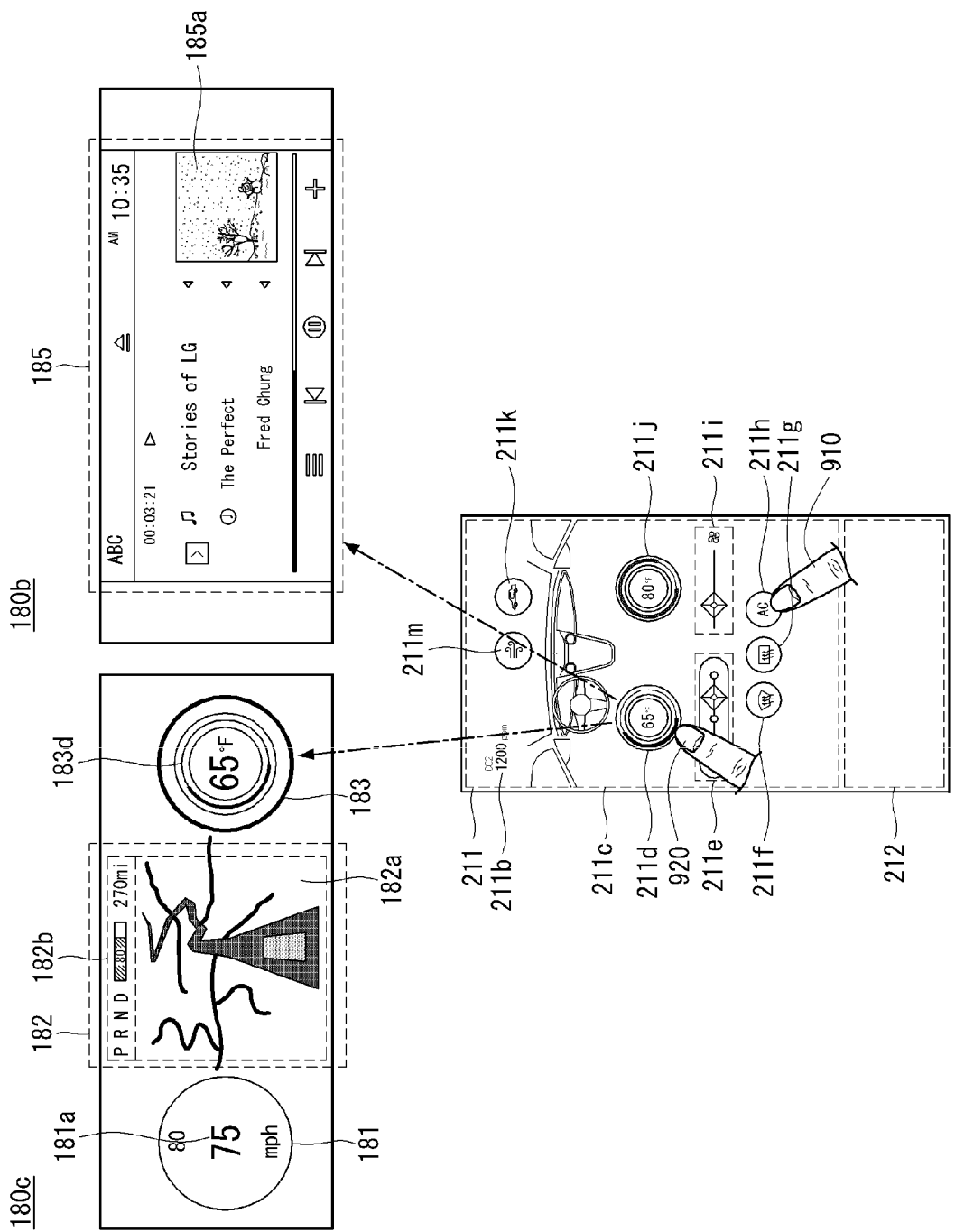

【Figure 20】
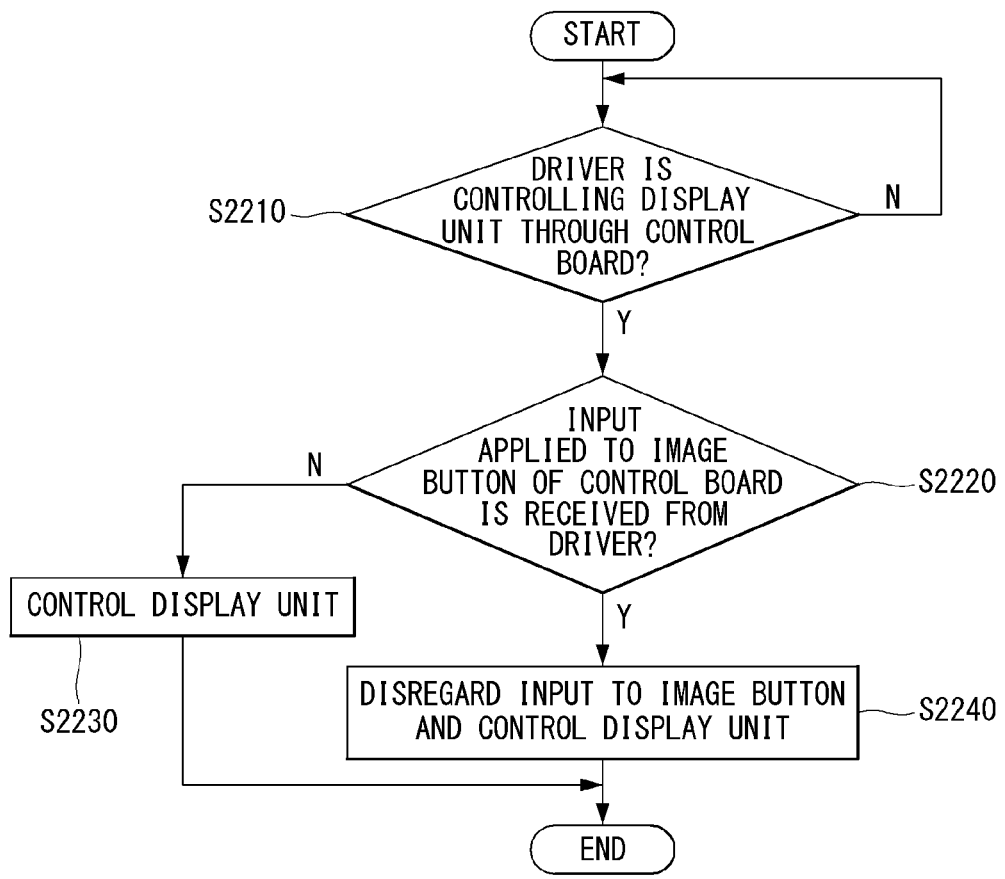

[Figure 21]
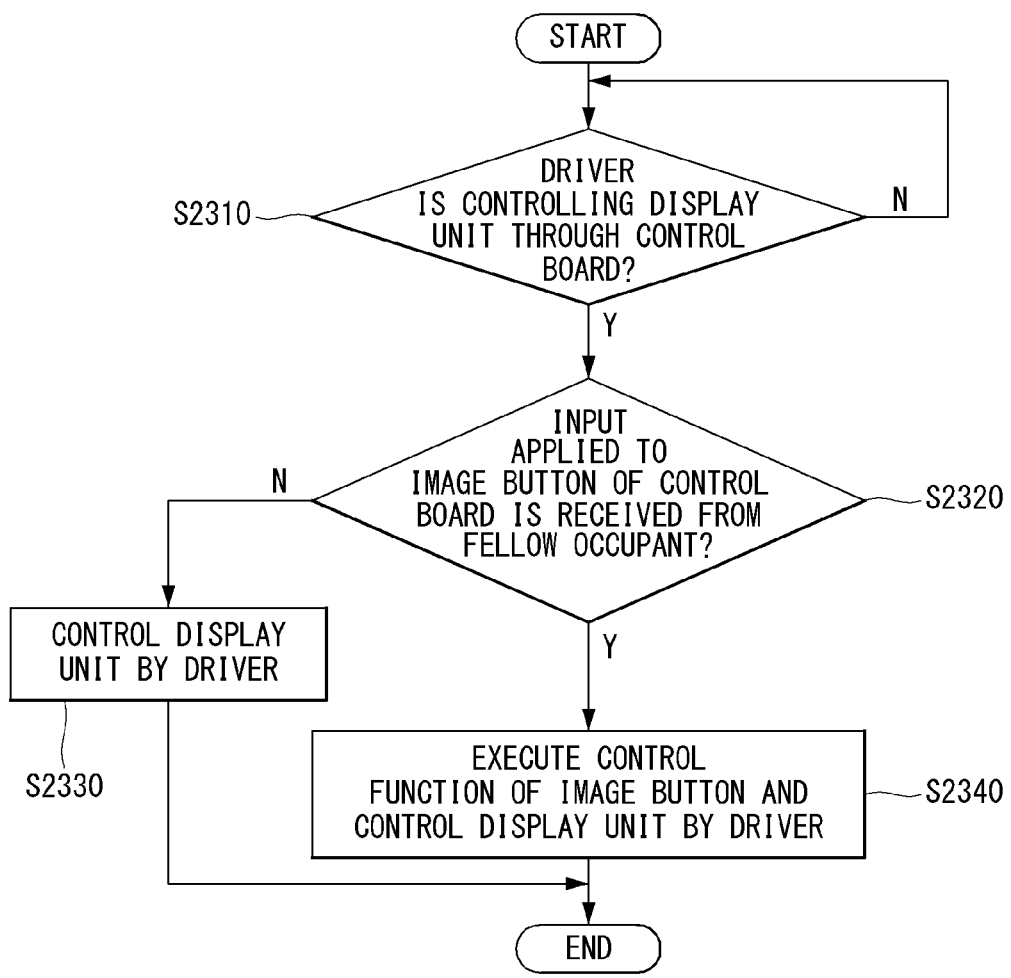

【Figure 22】
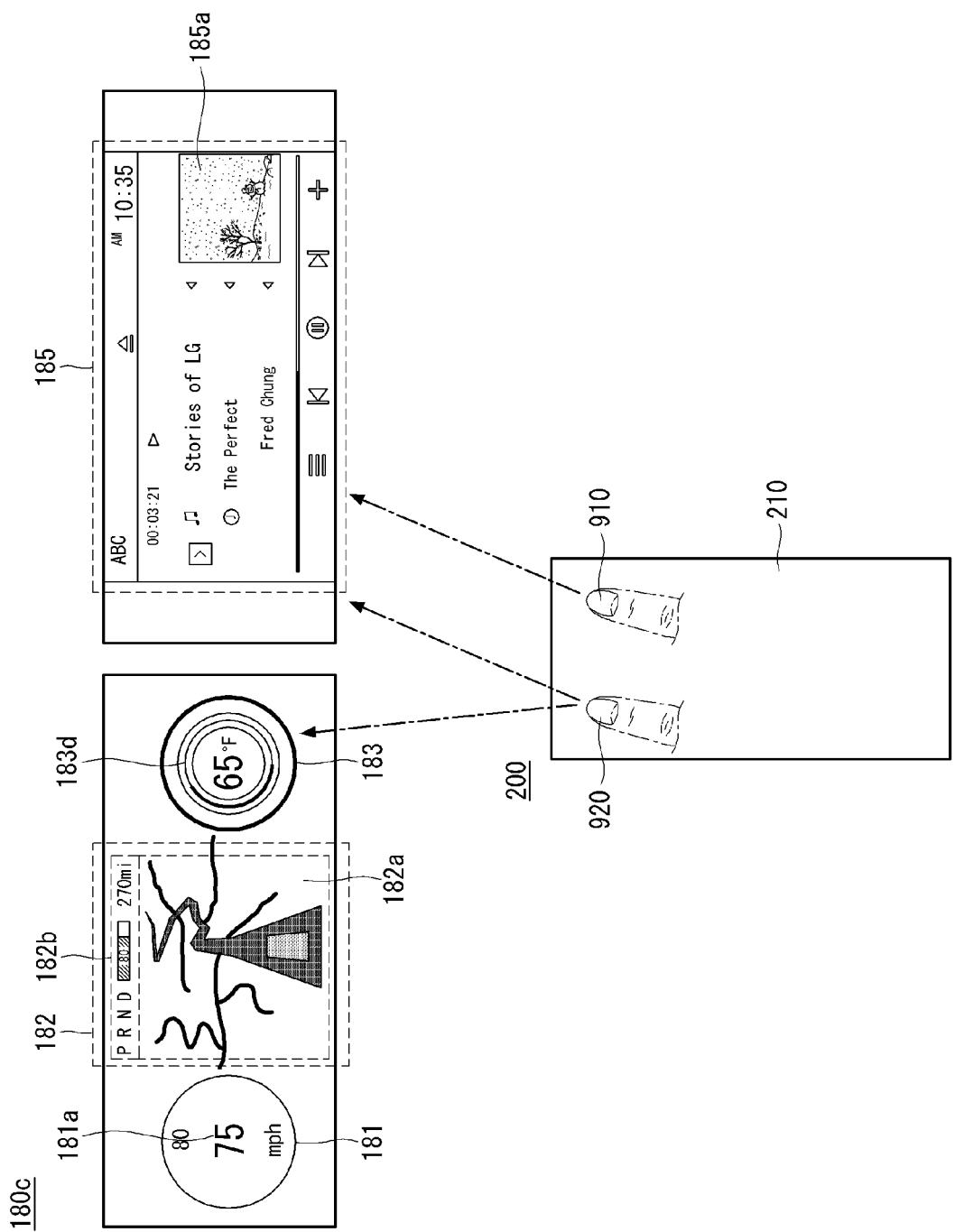

【Figure 23】
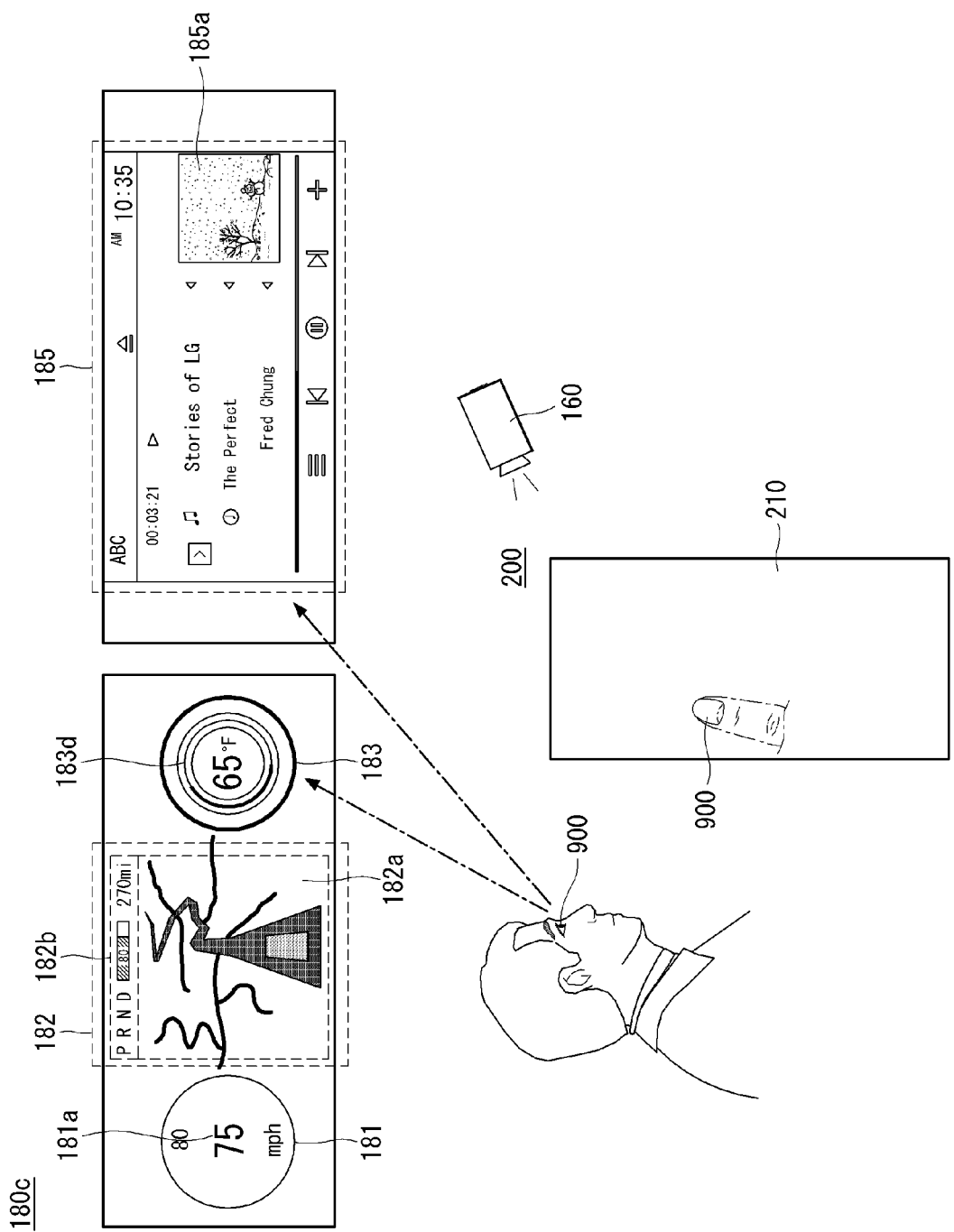

VEHICLE CONTROL DEVICE AND VEHICLE CONTROL METHOD

CROSS REFERENCE TO RELATED APPLICATIONS

This application is the National Phase of PCT International Application No. PCT/KR2018/015150, filed on Nov. 30, 2018, which is hereby expressly incorporated by reference into the present application.

TECHNICAL FIELD

The present invention relates to a vehicle control device and a vehicle control method.

BACKGROUND ART

Vehicles may be classified as internal combustion engine vehicles, external combustion engine vehicles, gas turbine vehicles, electric vehicles, and the like, according to types of prime movers used therein.

Recently, for the safety and convenience of drivers and pedestrians, smart vehicles have been actively developed and research into sensors to be mounted on the intelligent vehicles have actively been conducted. Cameras, infrared sensors, radars, global positioning systems (GPS), lidars, and gyroscopes are used in intelligent vehicles, among which cameras serve to substitute for human eyes.

Due to development of various sensors and electronic equipment, vehicles equipped with a driving assistance function of assisting an occupant in driving and improving driving safety and convenience has come to prominence.

DISCLOSURE

Technical Problem

An embodiment of the present invention provides a control device assisting driving of a vehicle.

Furthermore, an embodiment of the present invention provides a control device capable of controlling a display unit according to an input of an occupant.

Furthermore, an embodiment of the present invention provides a control device capable of providing a control function suitable for each occupant when there are a plurality of inputs from a plurality of occupants.

Furthermore, an embodiment of the present invention provides a control device capable of controlling a vehicle on the basis of a gaze of an occupant and a touch input of an occupant.

Furthermore, an embodiment of the present invention provides a method of assisting driving of a vehicle.

Furthermore, an embodiment of the present invention provides a control method for controlling a display unit according to an input of an occupant.

Furthermore, an embodiment of the present invention provides a control method capable of providing a control function suitable for each occupant when there are a plurality of inputs from a plurality of occupants.

Furthermore, an embodiment of the present invention provides a control method for controlling a vehicle on the basis of a gaze of an occupant and a touch input of the occupant.

Technical Solution

Furthermore, in this specification, a control device includes: an interface unit physically connected to a display unit, a control board receiving an input of an occupant, and a camera capturing an image of an area of a body of the occupant and the surroundings of the control board; and a processor exchanging information with the control board, the display unit, and the camera through the interface unit, wherein if it is determined that the occupant is present in the driver's seat through the camera and a first input is received from the occupant through the control board, the processor controls the display unit to display a display area corresponding to a position to which the first input is input on the control board, and when the display area is displayed in the display unit and a second input is received from the occupant through the control board, the processor selects or controls contents displayed in the display area.

The first input may include a third input and a fourth input, and the processor may activate the display area when the third input is received, and search for the contents when the fourth input is received.

The third input may be an input for touching the control board, the fourth input may be an input dragged in a touch state after the third input is applied, and the processor may control the display unit to display the contents to be varied according to the drag.

The second input may include a fifth input and a sixth input, and the processor may select the contents when the fifth input is received, and control the contents when the sixth input is received.

The fifth input may be an input for releasing the touch in a state of contacting the control board, and the processor may control the display unit to display the selected contents when the touch is released.

The display unit may include a first display and a second display adjacent to each other, and the processor may control the display unit to display the display area on either the first display or the second display.

The first display may be a cluster and the second display may be a center information display (CID).

The camera further may capture an image of an area of a body of a second occupant, and if a seventh input is received from the second occupant through the control board, the processor may control the display unit to display a second display area corresponding to a position to which the seventh input is applied on the control board.

If an eighth input is received from the second occupant via the control board, the processor may select or control contents displayed in the second display area.

If inputs are simultaneously received from the occupant and the second occupant through the control board, the processor may control contents displayed in the display area according to the input of the occupant and control contents displayed in the second display area according to the input of the second occupant.

The camera may further capture an image of an area of the body of the second occupant, and when an input is received from the second occupant through the control board, the processor may control the control board to display an image button for executing a control function of the vehicle.

The control board may display an image button for executing a control function of the vehicle, and the processor may not execute the control function and control the display area when the first input or the second input is received.

The camera may further capture an image of an area of the body of the second occupant, and if an input applied to the image button is received from the second occupant, the processor may execute the control function.

If an input of the occupant and an input of the second occupant applied to the image button are simultaneously received through the control board, the processor may control contents displayed in the display area according to the input of the occupant and execute the control function according to the input of the second occupant.

The camera may detect a direction of a gaze of the occupant, the processor may determine whether the gaze of the occupant is oriented to the second display through the camera, and if it is determined that the gaze of the occupant is oriented to the second display and the first input is received, the processor may control the display unit to display the display area on the second display.

The camera may detect a direction of a gaze of the second occupant, the processor may determine whether the gaze of the second occupant is oriented to the first display through the camera, and if it is determined that the gaze of the second occupant is oriented to the first display and a ninth input is received from the second occupant through the control board, the processor may control the display unit to display, on the first display, a second display area corresponding to a position to which the ninth input is applied on the control board.

Furthermore, in this specification, a control method includes: capturing an image of an area of a body of an occupant and the surrounding of a control board receiving an input of the occupant; determining whether the occupant is present in a driver's seat through the camera; determining that the occupant is present in the driver's seat and receiving a first input from the occupant through the control board; when the first input is received, displaying, on a display unit inside a vehicle, a display area corresponding to a position to which the first input is applied on the control board; receiving a second input from the occupant through the control board in a state in which the display area is displayed on the display unit; and when the second input is received, selecting or controlling contents displayed in the display area.

The first input may include a third input and a fourth input, the control method may further include: activating the display area when the third input is received; and searching for the contents when the fourth input is received.

The third input may be an input for touching the control board, the fourth input may be an input dragged in a touched state after the third input is applied, and the control method may further include: displaying, by the display unit, the contents to be varied according to the drag.

The second input may include a fifth input and a sixth input, and the control method may further include: selecting the contents if the fifth input is received; and controlling the contents if the sixth input is received.

Advantageous Effects

Effects of the control device according to the present invention are as follows.

According to at least one of the embodiments of the present invention, the control device assisting driving of a vehicle can be provided.

According to at least one embodiment of the present invention, the control device capable of controlling a display unit according to an input of an occupant can be provided.

According to at least one embodiment of the present invention, the control device capable of providing a control function suitable for each occupant when there are a plurality of inputs from a plurality of occupants can be provided.

According to at least one embodiment of the present invention, the control device capable of controlling a vehicle on the basis of a gaze of an occupant and a touch input of an occupant can be provided.

Effects of the control method according to the present invention are as follows.

According to at least one embodiment of the present invention, the method of assisting driving of a vehicle can be provided.

According to at least one embodiment of the present invention, the control method for controlling a display unit according to an input of an occupant can be provided.

According to at least one embodiment of the present invention, the control method capable of providing a control function suitable for each occupant when there are a plurality of inputs from a plurality of occupants can be provided.

According to at least one embodiment of the present invention, the control method for controlling a vehicle on the basis of a gaze of an occupant and a touch input of the occupant can be provided.

DESCRIPTION OF DRAWINGS

FIG. 1 shows an appearance of a vehicle including a control device according to an embodiment of the present invention.

FIG. 2 is an example of an internal block diagram of a vehicle.

FIG. 3 is a block diagram of a control device according to an embodiment of the present invention.

FIG. 4 is a plan view of a vehicle including a control device according to an embodiment of the present invention.

FIG. 5 shows an example of a camera according to an embodiment of the present invention.

FIGS. 6 and 7 are views showing the inside of a vehicle having a vehicle driving assistance apparatus according to an embodiment of the present invention.

FIGS. 8 to 23 are views showing a control device according to an embodiment of the present invention.

MODE FOR INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element may be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle as described in this specification may include a vehicle and a motorcycle. Hereinafter, a vehicle will be as an example of a vehicle.

A vehicle as described in this specification may include all of an internal combustion engine vehicle including an engine as a power source, a hybrid vehicle including both an engine and an electric motor as a power source, and an electric vehicle including an electric motor as a power source.

In some implementations, the left of a vehicle means the left of the vehicle in the direction of travel and the right of the vehicle means the right of the vehicle in the direction of travel.

In some implementations, a left hand drive (LHD) vehicle will be assumed unless otherwise stated.

Hereinafter, a user, a driver, an occupant, and a fellow occupant may be mixed according to an embodiment.

In the following description, a control device 100, a separate device provided in a vehicle, executes a vehicle driving assistance function, while exchanging necessary information with the vehicle through data communication. However, an aggregation of some of the units of the vehicle may also be defined as the control device 100. The control device 100 may also be referred to as a vehicle control device 100, a vehicle driving assistance device 100, or a driving assistance device 100.

When the control device 100 is a separate device, at least some of the units (see FIG. 3) of the control device 100 may not be included in the control device 100 and may be a unit of the vehicle or another device mounted in the vehicle. The external units may be understood as being included in the control device 100 by transmitting and receiving data through an interface unit of the control device 100.

For the purposes of description, the control device 100 according to an embodiment will be described as directly including the units shown in FIG. 3.

Hereinafter, the control device 100 according to an embodiment will be described in detail with reference to the drawings.

Referring to FIG. 1, a vehicle according to an embodiment may include wheels 13FL and 13RL rotated by a power source and the control device 100 providing driving assistance information to a user.

Referring to FIG. 2, the vehicle may include the communication unit 710, the input unit 720, the sensing unit 760, an output unit 740, a vehicle drive unit 750, a memory 730, an interface unit 780, the controller 770, the power source unit 790, the driver assistance apparatus 100, and the AVN apparatus 400. The communication unit 710 may include one or more modules to enable the wireless communication between the vehicle 700 and the mobile terminal 600, between the vehicle 700 and the external server 510, or between the vehicle 700 and another vehicle. In addition, the communication unit 710 may include one or more modules to connect the vehicle 700 to one or more networks.

The communication unit 710 may include a broadcast receiving module 711, a wireless Internet module 712, a short-range communication module 713, a location information module 714, and an optical communication module 715.

The broadcast receiving module 711 is configured to receive a broadcast signal or broadcast associated information from an external broadcast managing server via a broadcast channel. Here, broadcast includes radio broadcast or TV broadcast.

The wireless Internet module 712 is a module for wireless Internet access. The wireless Internet module 712 may be internally or externally coupled to the vehicle 700. The wireless Internet module 712 may transmit or receive wireless signals via communication networks according to wireless Internet technologies.

Examples of such wireless Internet technologies include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), and LTE-A (Long Term Evolution-Advanced). The wireless Internet module 712 may transmit and receive data according to one or more of such wireless Internet technologies, and other Internet technologies as well. For example, the wireless Internet module 712 may exchange data with the external server 510 in a wireless manner. The wireless Internet module 712 may receive weather information and road traffic state information (e.g., Transport Protocol Expert Group (TPEG) information) from the external server 510.

The short-range communication module 713 may assist short-range communication using at least one selected from among Bluetooth™, Radio Frequency IDdentification (RFID), Infrared Data Association (IrDA). Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication module 713 forms wireless area networks to perform the short-range communication between the vehicle 700 and at least one external device. For example, the short-range communication module 713 may exchange data with the mobile terminal 600 in a wireless manner. The short-range communication module 713 may receive weather information and road traffic state information (e.g., Transport Protocol Expert Group (TPEG) information) from the mobile terminal 600. When the user gets into the vehicle 700, the mobile terminal 600 of the user and the vehicle 700 may pair with each other automatically or as the user executes a pairing application.

The location information module 714 is a module to acquire a location of the vehicle 700. A representative example of the location information module 714 includes a Global Position System (GPS) module. For example, when the vehicle utilizes a GPS module, a location of the vehicle may be acquired using signals transmitted from GPS satellites.

The optical communication module 715 may include a light emitting unit and a light receiving unit.

The light receiving unit may convert light into electrical signals to receive information. The light receiving unit may include Photo Diodes (PDPs) to receive light. The photo diodes may convert light into electrical signals. For example, the light receiving unit may receive information regarding a preceding vehicle via light emitted from a light source included in the preceding vehicle.

The light emitting unit may include at least one light emitting element to convert electrical signals into light. Here, the light emitting element may be a Light Emitting Diode (LED). The light emitting unit converts electrical signals into light to thereby emit the light. For example, the light emitting unit may externally emit light via flickering of the light emitting element corresponding to a prescribed frequency. In some embodiments, the light emitting unit may include an array of a plurality of light emitting elements. In some embodiments, the light emitting unit may be integrated with a lamp provided in the vehicle 700. For example, the light emitting unit may be at least one selected from among a headlight, a taillight, a brake light, a turn signal light, and a sidelight. For example, the optical communication module 715 may exchange data with another vehicle 520 via optical communication.

The input unit 720 may include a driving operation unit 721, the camera 722, a microphone 723, and the user input unit 724.

The driving operation unit 721 is configured to receive user input for the driving of the vehicle 700. The driving operation unit 721 may include the steering input unit 721*a*, a shift input unit 721*b*, an acceleration input unit 721*c*, and a brake input unit 721*d*.

The steering input unit 721*a* is configured to receive user input with regard to the direction of travel of the vehicle 700. The steering input unit 721*a* may take the form of the steering wheel 12 as illustrated in FIG. 1. In some embodiments, the steering input unit 721*a* may be configured as a touchscreen, a touch pad, or a button.

The shift input unit 721*b* is configured to receive input for selecting one of Park (P), Drive (D), Neutral (N) and Reverse (R) gears of the vehicle 700 from the user. The shift input unit 721*b* may have a lever form. In some embodiments, the shift input unit 721*b* may be configured as a touchscreen, a touch pad, or a button.

The acceleration input unit 721*c* is configured to receive user input for the acceleration of the vehicle 700. The brake input unit 721*d* is configured to receive user input for the speed reduction of the vehicle 700. Each of the acceleration input unit 721*c* and the brake input unit 721*d* may have a pedal form. In some embodiments, the acceleration input unit 721*c* or the brake input unit 721*d* may be configured as a touchscreen, a touch pad, or a button.

The camera 722 may include an image sensor and an image processing module. The camera 722 may process a still image or a moving image acquired by the image sensor (e.g., a CMOS or a CCD). The image processing module may extract required information by processing a still image or a moving image acquired via the image sensor and, then, may transmit the extracted information to the controller 770. Meanwhile, the vehicle 700 may include the camera 722 to capture a forward image or a surround-view image of the vehicle and an monitoring unit 725 to capture an image of the inside of the vehicle.

The monitoring unit 725 may capture an image of an occupant. The monitoring unit 725 may capture an image of biometrics of the occupant.

Meanwhile, although FIG. 2 illustrates the camera 722 as being included in the input unit 720, the camera 722 may be described as being a component of the driver assistance apparatus 100 as described above with reference to FIGS. 2 to 6.

The microphone 723 may process external sound signals into electrical data. The processed data may be utilized in various ways according to a function that the vehicle 700 is performing. The microphone 723 may convert a user voice command into electrical data. The converted electrical data may be transmitted to the controller 770.

Meanwhile, in some embodiments, the camera 722 or the microphone 723 may be components of the sensing unit 760, other than components of the input unit 720.

The user input unit 724 is configured to receive information from the user. When information is input via the user input unit 724, the controller 770 may control the operation of the vehicle 700 to correspond to the input information. The user input unit 724 may include a touch input unit or a mechanical input unit. In some embodiments, the user input unit 724 may be located in a region of the steering wheel. In this case, the driver may operate the user input unit 724 with the fingers while gripping the steering wheel.

The sensing unit 760 is configured to detect signals associated with, for example, the traveling of the vehicle 700. To this end, the sensing unit 760 may include a collision sensor, a steering sensor, a speed sensor, gradient sensor, a weight sensor, a heading sensor, a yaw sensor, a gyro sensor, a position module, a vehicle forward/backward movement sensor, a battery sensor, a fuel sensor, a tire sensor, a steering sensor on the basis of the rotation of a steering wheel, a vehicle inside temperature sensor, a vehicle inside humidity sensor, an ultrasonic sensor, an infrared sensor, a radar, and Lidar.

As such, the sensing unit 760 may acquire sensing signals with regard to, for example, vehicle collision information, vehicle traveling direction information, vehicle location information (GPS information), vehicle angle information, vehicle speed information, vehicle acceleration information, vehicle tilt information, vehicle forward/backward movement information, battery information, fuel information, tire information, vehicle lamp information, vehicle inside temperature information, vehicle inside humidity information, and steering wheel rotation angle information. In addition, the driver assistance apparatus 100 that will be described below may generate control signals for acceleration, speed reduction, direction change and the like of the vehicle 700 on the basis of surrounding environment information acquired by at least one of the camera, the ultrasonic sensor, the infrared sensor, the radar, and Lidar included in the vehicle 700. Here, the surrounding environment information may be information related to various objects located within a prescribed distance range from the vehicle 700 that is traveling. For example, the surrounding environment information may include the number of obstacles located within a distance of 100 m from the vehicle 700, the distances to the obstacles, the sizes of the obstacles, the kinds of the obstacles, and the like.

Meanwhile, the sensing unit 760 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The sensing unit 760 may include a biometric information sensing unit. The biometric information sensing unit is configured to detect and acquire biometric information of the occupant. The biometric information may include fingerprint information, iris-scan information, retina-scan information, hand geometry information, facial recognition information, and voice recognition information. The biometric information sensing unit may include a sensor to detect biometric information of the occupant. Here, the monitoring unit 725 and the microphone 723 may operate as sensors. The biometric information sensing unit may acquire hand geometry information and facial recognition information via the monitoring unit 725.

The output unit 740 is configured to output information processed in the controller 770. The output unit 740 may include the display unit 741, a sound output unit 742, and a haptic output unit 743.

The display unit 741 may display information processed in the controller 770. For example, the display unit 741 may display vehicle associated information. Here, the vehicle associated information may include vehicle control information for the direct control of the vehicle or driver assistance information to guide vehicle driving. In addition, the vehicle associated information may include vehicle state information that notifies a current state of the vehicle or vehicle traveling information regarding the traveling of the vehicle.

The display unit 741 may include at least one selected from among a Liquid Crystal Display (LCD), a Thin Film Transistor LCD (TFT LCD), an Organic Light Emitting Diode (OLED), a flexible display, a 3D display, and an e-ink display.

The display unit 741 may configure an inter-layer structure with a touch sensor, or may be integrally formed with the touch sensor to implement a touchscreen. The touchscreen may function as the user input unit 724 which provides an input interface between the vehicle 700 and the user and also function to provide an output interface between the vehicle 700 and the user. In this case, the display unit 741 may include a touch sensor which detects a touch to the display unit 741 so as to receive a control command in a touch manner.

When a touch is input to the display unit 741 as described above, the touch sensor may detect the touch and the controller 770 may generate a control command corresponding to the touch. Contents input in a touch manner may be characters or numbers, or may be, for example, instructions in various modes or menu items that may be designated.

The touch sensor and the proximity sensor may be implemented individually, or in combination, to detect various types of touches. Such touches includes a short (or tap) touch, a long touch, a multi-touch, a drag touch, a flick touch, a pinch-in touch, a pinch-out touch, a swipe touch, a hovering touch, and the like. Hereinafter, a touch or a touch input may generally refer to various types of touches mentioned above.

Meanwhile, the display unit 741 may include a cluster to allow the driver to check vehicle state information or vehicle traveling information while driving the vehicle. The cluster may be located on a dashboard. In this case, the driver may check information displayed on the cluster while looking forward.

Meanwhile, in some embodiments, the display unit 741 may be implemented as a Head Up display (HUD). When the display unit 741 is implemented as a HUD, information may be output via a transparent display provided at the windshield. Alternatively, the display unit 741 may include a projector module to output information via an image projected to the windshield.

The sound output unit 742 is configured to convert electrical signals from the controller 770 into audio signals and to output the audio signals. To this end, the sound output unit 742 may include, for example, a speaker. The sound output unit 742 may output sound corresponding to the operation of the user input unit 724.

The haptic output unit 743 is configured to generate tactile output. For example, the haptic output unit 743 may operate to vibrate a steering wheel, a safety belt, or a seat so as to allow the user to recognize an output thereof.

The vehicle drive unit 750 may control the operation of various devices of the vehicle. The vehicle drive unit 750 may include at least one of a power source drive unit 751, a steering drive unit 752, a brake drive unit 753, a lamp drive unit 754, an air conditioner drive unit 755, a window drive unit 756, an airbag drive unit 757, a sunroof drive unit 758, and a suspension drive unit 759.

The power source drive unit 751 may perform electronic control for a power source inside the vehicle 700. The power source drive unit 751 may include an acceleration device to increase the speed of the vehicle 700 and a speed reduction device to reduce the speed of the vehicle 700.

For example, in the case where a fossil fuel based engine (not illustrated) is a power source, the power source drive unit 751 may perform electronic control for the engine. As such, the power source drive unit 751 may control, for example, an output torque of the engine. In the case where the power source drive unit 751 is the engine, the power source drive unit 751 may control the speed of the vehicle by controlling the output torque of the engine under the control of the controller 770.

In another example, when an electric motor (not illustrated) is a power source, the power source drive unit 751 may perform control for the motor. As such, the power source drive unit 751 may control, for example, the RPM and torque of the motor.

The steering drive unit 752 may include a steering apparatus. Thus, the steering drive unit 752 may perform electronic control for a steering apparatus inside the vehicle 700.

The brake drive unit 753 may perform electronic control of a brake apparatus (not illustrated) inside the vehicle 700. For example, the brake drive unit 753 may reduce the speed of the vehicle 700 by controlling the operation of brakes located at wheels. In another example, the brake drive unit 753 may adjust the direction of travel of the vehicle 700 leftward or rightward by differentiating the operation of respective brakes located at left and right wheels.

The lamp drive unit 754 may turn at least one lamp arranged inside and outside the vehicle 700 on or off. The lamp drive unit 754 may include a lighting apparatus. In addition, the lamp drive unit 754 may control, for example, the intensity and direction of light of each lamp included in the lighting apparatus. For example, the lamp drive unit 754 may perform control for a turn signal lamp, a headlamp or a brake lamp.

The air conditioner drive unit 755 may perform the electronic control of an air conditioner (not illustrated) inside the vehicle 700. For example, when the inside temperature of the vehicle 700 is high, the air conditioner drive unit 755 may operate the air conditioner to supply cold air to the inside of the vehicle 700.

The window drive unit 756 may perform the electronic control of a window apparatus inside the vehicle 700. For example, the window drive unit 756 may control the opening or closing of left and right windows of the vehicle 700.

The airbag drive unit 757 may perform the electronic control of an airbag apparatus inside the vehicle 700. For example, the airbag drive unit 757 may control an airbag to be deployed in a dangerous situation.

The sunroof drive unit 758 may perform electronic control of a sunroof apparatus inside the vehicle 700. For example, the sunroof drive unit 758 may control the opening or closing of a sunroof.

The suspension drive unit 759 may perform electronic control on a suspension apparatus (not shown). For example, when a road surface has a curve, the suspension drive unit 759 may control the suspension apparatus to reduce vibrations of a vehicle.

The memory 730 is electrically connected to the controller 770. The memory 730 may store basic data for each unit, control data for the operation control of the unit, and input/output data. The memory 730 may be various hardware storage devices such as, for example, a ROM, a RAM, an EPROM, a flash drive, and a hard drive. The memory 730 may store various data for the overall operation of the vehicle 700 such as, for example programs for the processing or control of the controller 770.

The interface unit 780 may serve as a passage for various kinds of external devices that are connected to the vehicle 700. For example, the interface unit 780 may have a port that is connectable to the mobile terminal 600 and may be connected to the mobile terminal 600 via the port. In this case, the interface unit 780 may exchange data with the mobile terminal 600.

Meanwhile, the interface unit 780 may serve as a passage for the supply of electrical energy to the connected mobile terminal 600. When the mobile terminal 600 is electrically connected to the interface unit 780, the interface unit 780 supplies electrical energy from the power source unit 790 to the mobile terminal 600 under the control of the controller 770.

The controller 770 may control the overall operation of each unit inside the vehicle 700. The controller 770 may be referred to as an Electronic Control Unit (ECU).

The controller 770 may execute a function corresponding to an execution signal delivered from the control device 100.

The controller 770 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The controller 770 may play the role of the processor 170 described above. That is, the processor 170 of the control device 100 may directly set in the controller 770 of the vehicle. In this embodiment, the control device 100 may be understood to designate a combination of some components of the vehicle.

Further, the controller 770 may control components to transmit information requested by the processor 170.

The power source unit 790 may supply power required to operate the respective components under the control of the controller 770. In particular, the power source unit 790 may receive power from, for example, a battery (not illustrated) inside the vehicle 700.

The AVN apparatus 400 may exchange data with the controller 770. The controller 770 may receive navigation information from the AVN apparatus 400 or a separate navigation apparatus (not illustrated). Here, the navigation information may include set destination information, destination based routing information, and map information or vehicle location information related to vehicle traveling.

Referring to FIG. 3, the vehicle control device 100 may include an input unit 110, a communication unit 120, an interface 130, a sensor unit 155, a monitoring unit 165, a processor 170, a display unit 180, an audio output unit 185, and a power supply unit 190. However, the units of the vehicle control device 100 of FIG. 3 are unnecessary to realize the vehicle control device 100. Thus, the vehicle control device 100 described in this specification may include additional components in addition to the above-described components, or a portion of the above-described components may be omitted.

Each component will now be described in detail. The vehicle control device 100 may include the input unit 110 for receiving user input.

For example, a user may input setting/execution of the vehicle surrounding image display function and the self-driving function, which are provided by the vehicle control device 100, or may input execution of power on/off of the vehicle control device 100 through the input unit 110.

The input unit 110 may include at least one of a gesture input unit (e.g., an optical sensor, etc.) for sensing a user gesture, a touch input unit (e.g., a touch sensor, a touch key, a push key (mechanical key), etc.) for sensing touch and a microphone for sensing voice input and receive user input.

Next, the vehicle control device 100 may include the communication unit 120 for communicating with another vehicle 510, a terminal 600 and a server 500.

The communication unit 120 may receive changed information in outer appearance of the vehicle or vehicle surrounding information from an object mounted on the outside of the vehicle or a structure for mounting the object. Also, the vehicle control device 100 may display the vehicle surrounding image on the basis of the changed information in outer appearance of the vehicle and the vehicle surrounding information and provide the self-driving function.

In detail, the communication unit 120 may receive at least one of position information, weather information and road traffic condition information (e.g., transport protocol experts group (TPEG), etc.) from the mobile terminal 600 and/or the server 500.

The communication unit 120 may receive traffic information from the server 500 having an intelligent traffic system (ITS). Here, the traffic information may include traffic signal information, lane information, vehicle surrounding information or position information.

In addition, the communication unit 120 may receive navigation information from the server 500 and/or the mobile terminal 600. Here, the navigation information may include at least one of map information related to vehicle driving, lane information, vehicle position information, set destination information and route information according to the destination.

For example, the communication unit 120 may receive the real-time position of the vehicle as the navigation information. In detail, the communication unit 120 may include a global positioning system (GPS) module and/or a Wi-Fi (Wireless Fidelity) module and acquire the position of the vehicle.

In addition, the communication unit 120 may receive driving information of the other vehicle 510 from the other vehicle 510 and transmit information on this vehicle, thereby sharing driving information between vehicles. Here, the shared driving information may include vehicle traveling direction information, position information, vehicle speed information, acceleration information, moving route information, forward/reverse information, adjacent vehicle information, and turn signal information.

In addition, when a user rides in the vehicle, the mobile terminal 600 of the user and the vehicle control device 100 may pair with each other automatically or by executing a user application.

The communication unit 120 may exchange data with the other vehicle 510, the mobile terminal 600 or the server 500 in a wireless manner.

In detail, the communication unit 120 may perform wireless communication using a wireless data communication method. As the wireless data communication method, technical standards or communication methods for mobile communications (for example, Global System for Mobile Communication (GSM), Code Division Multiple Access (CDMA), CDMA2000 (Code Division Multiple Access 2000), EV-DO (Evolution-Data Optimized), Wideband CDMA (WCDMA), High Speed Downlink Packet Access (HSDPA), HSUPA (High Speed Uplink Packet Access), Long Term Evolution (LTE), LTE-A (Long Term Evolution-Advanced), and the like) may be used.

The communication unit 120 is configured to facilitate wireless Internet technology. Examples of such wireless Internet technology include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like.

In addition, the communication unit 120 is configured to facilitate short-range communication. For example, short-range communication may be supported using at least one of Bluetooth™, Radio Frequency IDentification (RFID), Infrared Data Association (IrDA), Ultra-Wideband (UWB), ZigBee, Near Field Communication (NFC), Wireless-Fidelity (Wi-Fi), Wi-Fi Direct, Wireless USB (Wireless Universal Serial Bus), and the like.

In addition, the vehicle control device 100 may pair with the mobile terminal located inside the vehicle using a short-range communication method and wirelessly exchange data with the other vehicle 510 or the server 500 using a long-distance wireless communication module of the mobile terminal.

Next, the vehicle control device 100 may include the interface 130 for receiving data of the vehicle and transmitting a signal processed or generated by the processor 170.

In detail, the vehicle control device 100 may receive at least one of driving information of another vehicle, navigation information and sensor information via the interface 130.

In addition, the vehicle control device 100 may transmit a control signal for executing a driving assistance function or information generated by the vehicle control device 100 to the controller 770 of the vehicle via the interface 130.

To this end, the interface 130 may perform data communication with at least one of the controller 770 of the vehicle, an audio-video-navigation (AVN) apparatus 400 and the sensing unit 760 using a wired or wireless communication method.

In detail, the interface 130 may receive navigation information by data communication with the controller 770, the AVN apparatus 400 and/or a separate navigation apparatus.

In addition, the interface 130 may receive sensor information from the controller 770 or the sensing unit 760.

Here, the sensor information may include at least one of vehicle traveling direction information, vehicle position information, vehicle speed information, acceleration information, vehicle tilt information, forward/reverse information, fuel information, information on a distance from a preceding/rear vehicle, information on a distance between a vehicle and a lane and turn signal information, etc.

The sensor information may be acquired from a heading sensor, a yaw sensor, a gyro sensor, a position module, a vehicle forward/reverse sensor, a wheel sensor, a vehicle speed sensor, a vehicle tilt sensor, a battery sensor, a fuel sensor, a tire sensor, a steering sensor on the basis of rotation of the steering wheel, a vehicle inside temperature sensor, a vehicle inside humidity sensor, a door sensor, etc. The position module may include a GPS module for receiving GPS information.

The interface 130 may receive user input via the user input unit 110 of the vehicle. The interface 130 may receive user input from the input unit of the vehicle or via the controller 770. That is, when the input unit is provided in the vehicle, user input may be received via the interface 130.

In addition, the interface 130 may receive traffic information acquired from the server. The server 500 may be located at a traffic control surveillance center for controlling traffic. For example, when traffic information is received from the server 500 via the communication unit 120 of the vehicle, the interface 130 may receive traffic information from the controller 770.

Next, the memory 140 may store a variety of data for overall operation of the vehicle control device 100, such as a program for processing or control of the controller 170.

In addition, the memory 140 may store data and commands for operation of the vehicle control device 100 and a plurality of application programs or applications executed in the vehicle control device 100. At least some of such application programs may be downloaded from an external server through wireless communication. At least one of such application programs may be installed in the vehicle control device 100 upon release, in order to provide the basic function (e.g., the driver assistance information guide function) of the vehicle control device 100.

Such application programs may be stored in the memory 140 and may be executed to perform operation (or function) of the vehicle control device 100 by the processor 170.

The memory 140 may store data for checking an object included in an image. For example, the memory 140 may store data for checking a predetermined object using a predetermined algorithm when the predetermined object is detected from an image of the vicinity of the vehicle acquired through the camera 160.

For example, the memory 140 may store data for checking the object using the predetermined algorithm when the predetermined algorithm such as a lane, a traffic sign, a two-wheeled vehicle and a pedestrian is included in an image acquired through the camera 160.

The memory 140 may be implemented in a hardware manner using at least one selected from among a flash memory, a hard disk, a solid state drive (SSD), a silicon disk drive (SDD), a micro multimedia card type, a card type memory (e.g., an SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc.

In addition, the vehicle control device 100 may operate in association with a network storage for performing a storage function of the memory 140 over the Internet.

Next, the monitoring unit 165 may acquire information on the internal state of the vehicle.

The information detected by the monitoring unit may include at least one of facial recognition information, fingerprint information, iris-scan information, retina-scan information, hand geo-metry information, and voice recognition information. The monitoring unit may include other sensors for sensing such biometric recognition information.

Next, the vehicle control device 100 may further include the sensor unit 155 for sensing objects located in the vicinity of the vehicle. The vehicle control device 100 may include the sensor unit 155 for sensing peripheral objects and may receive the sensor information obtained by the sensor unit 155 of the vehicle via the interface 130. The acquired sensor information may be included in the information on the vehicle surrounding information.

The sensor unit 155 may include at least one of a distance sensor 150 for sensing the position of an object located in the vicinity of the vehicle and a camera 160 for capturing the image of the vicinity of the vehicle.

First, the distance sensor 150 may accurately detect the position of the object located in the vicinity of the vehicle, a distance between the object and the vehicle, a movement direction of the object, etc. The distance sensor 150 may continuously measure the position of the detected object to accurately detect change in positional relationship with the vehicle.

The distance sensor 150 may detect the object located in at least one of the front, rear, left and right areas of the vehicle. The distance sensor 150 may be provided at various positions of the vehicle.

FIG. 3 illustrates an example exterior of a vehicle including an example vehicle control device. Referring to FIG. 3, the distance sensor 150 may be provided at at least one of the front, rear, left and right sides and ceiling of the vehicle.

The distance sensor 150 may include at least one of various distance measurement sensors such as a Lidar sensor, a laser sensor, an ultrasonic wave sensor and a stereo camera.

For example, the distance sensor 150 is a laser sensor and may accurately measure a positional relationship between the vehicle and the object using a time-of-flight (TOF) and/or a phase-shift method according to a laser signal modulation method.

Information on the object may be acquired by analyzing the image captured by the camera 160 at the processor 170.

In detail, the vehicle control device 100 may capture the image of the vicinity of the vehicle using the camera 160, analyze the image of the vicinity of the vehicle using the processor 170, detect the object located in the vicinity of the vehicle, determine the attributes of the object and generate sensor information.

The image information is at least one of the type of the object, traffic signal information indicated by the object, the distance between the object and the vehicle and the position of the object and may be included in the sensor information.

In detail, the processor 170 may detect the object from the captured image via image processing, track the object, measure the distance from the object, and check the object to analyze the object, thereby generating image information.

The camera 160 may be provided at various positions.

In detail, the camera 160 may include an internal camera 160f for capturing an image of the front side of the vehicle within the vehicle and acquiring a front image.

Referring to FIG. 3, a plurality of cameras 160 may be provided at least one of the front, rear, right and left and ceiling of the vehicle.

In detail, the left camera 160b may be provided inside a case surrounding a left side view mirror. Alternatively, the left camera 160b may be provided outside the case surrounding the left side view mirror. Alternatively, the left camera 160b may be provided in one of a left front door, a left rear door or an outer area of a left fender.

The right camera 160c may be provided inside a case surrounding a right side view mirror. Alternatively, the right camera 160c may be provided outside the case surrounding the right side view mirror. Alternatively, the right camera 160c may be provided in one of a right front door, a right rear door or an outer area of a right fender.

In addition, the rear camera 160d may be provided in the vicinity of a rear license plate or a trunk switch. The front camera 160a may be provided in the vicinity of an emblem or a radiator grill.

The processor 170 may synthesize images captured in all directions and provide an around view image viewed from the top of the vehicle. Upon generating the around view image, boundary portions between the image regions occur. Such boundary portions may be subjected to image blending for natural display.

In addition, the ceiling camera 160e may be provided on the ceiling of the vehicle to capture the image of the vehicle in all directions.

The camera 160 may directly include an image sensor and an image processing module. The camera 160 may process a still image or a moving image obtained by the image sensor (e.g., CMOS or CCD). In addition, the image processing module processes the still image or the moving image acquired through the image sensor, extracts necessary image information, and delivers the extracted image information to the processor 170.

In order to enable the processor 170 to more easily perform object analysis, for example, the camera 160 may be a stereo camera for capturing an image and, at the same time, measuring a distance from an object.

The sensor unit 155 may be a stereo camera including the distance sensor 150 and the camera 160. That is, the stereo camera may acquire an image and, at the same time, detect a positional relationship with the object.

Referring to FIG. 5, the stereo camera 160 may include a first camera 160a having a first lens 163a and a second camera 160b having a second lens 163b.

Meanwhile, the vehicle driving assistance apparatus may further includes a first light shield 162a and a second light shield 162b for shielding light incident on the first lens 163a and the second lens 163b, respectively.

This vehicle driving assistance apparatus may obtain a stereo image of the surroundings of the vehicle from the first and second cameras 160a and 160b, perform disparity detection on the basis of the stereo image, detect an object from at least one stereo image on the basis of disparity information, and continue to track movement of the object after the object is detected.

Next, the control device 100 may further include a display unit 180 displaying a graphic image. The display unit 180 may include a plurality of displays. In detail, the display unit 180 may include a first display 180a for projecting and displaying a graphic image onto and on a vehicle windshield W. That is, the first display 180a is a head up display (HUD) and may include a projection module for projecting the graphic image onto the windshield W. The graphic image projected by the projection module may have predetermined transparency. Accordingly, a user may simultaneously view the front and rear sides of the graphic image.

The graphic image may overlap the image projected onto the windshield W to achieve augmented reality (AR).

The display unit may include a second display 180b separately provided inside the vehicle to display an image of the driving assistance function.

In detail, the second display 180b may be a display of a vehicle navigation apparatus or a center information display (CID). The third display 180c may be a cluster.

The second display 180b may include at least one selected from among a Liquid Crystal Display (LCD), a Thin Film Transistor LCD (TFT LCD), an Organic Light Emitting Diode (OLED), a flexible display, a 3D display, and an e-ink display.

The second display 180b and the third display 180c may be combined with a touch input unit to achieve a touch screen.

Next, the audio output unit 185 may audibly output a message for explaining the function of the vehicle display apparatus 100 and checking whether the driving assistance function is performed. That is, the vehicle display apparatus 100 may provide explanation of the function of the vehicle display apparatus 100 via visual display of the display unit 180 and audio output of the audio output unit 185.

Next, the haptic output unit may output an alarm for the driving assistance function in a haptic manner. For example, the vehicle display apparatus 100 may output vibration to the user when a warning is included in at least one of navigation information, traffic information, communication information, vehicle state information, advanced driver assistance system (ADAS) function and other driver convenience information.

The haptic output unit may provide directional vibration. For example, the haptic output unit may be provided in a steering apparatus for controlling steering to output vibration. Left or right vibration may be output according to the left and right sides of the steering apparatus to enable directional haptic output.

In addition, the power supply unit 190 may receive power and supply power necessary for operation of the components under control of the processor 170.

Lastly, the vehicle display apparatus 100 may include the processor 170 for controlling overall operation of the units of the vehicle display apparatus 100.

In addition, the processor 170 may control at least some of the components described with reference to FIG. 3 in order to execute the application program.

Further, the processor 170 may operate by combining at least two of the components included in the vehicle display apparatus 100, in order to execute the application program.

The processor 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, and electric units for the implementation of other functions.

The processor 170 may control overall operation of the vehicle display apparatus 100 in addition to operation related to the application programs stored in the memory 140. The processor 170 may process signals, data, information, etc. via the above-described components or execute the application programs stored in the memory 140 to provide appropriate information or functions to the user.

Traveling information includes a traveling mode of the vehicle 700, a state of the vehicle 700, a traveling state, a movement direction of the vehicle 700, a surrounding situation of the vehicle 700, an internal situation of the vehicle, and the like.

The traveling mode may be distinguished depending on whether driving of the vehicle 700 is manually performed by the driver, whether the driving of the vehicle 700 is automatically performed by the processor 170, or whether part of the driving of the vehicle 700 is performed manually by the driver and the other part thereof is performed automatically by the processor 170.

Referring to FIG. 7, the control board 200 may be installed inside the vehicle 700. The control board 200 may be located on one side of a driver's seat S1. Alternatively, the control board 200 may be located between the driver's seat S1 and a passenger's seat S2. A camera 160h may image the inside of the vehicle 700. Alternatively, the camera 160h may image the surroundings of the driver's seat S1, surroundings of the control board 200, and surroundings of the passenger's seat S2. The control board 200 may be referred to as a center console 200 or a console 200.

When a plurality of occupants 900 are present on the vehicle 700, the processor 170 may detect from which of the occupants 900 an input is received by the control board 200 through the camera 160h.

The display unit 180 may include at least one of a liquid crystal display (LCD), a thin film transistor-liquid crystal display (TFT LCD), an organic light-emitting diode (OLED) display, a flexible display, a 3D display, and an e-ink display.

The display unit 180 may configure an inter-layer structure with a touch sensor, or may be integrally formed with the touch sensor to implement a touchscreen. The touchscreen may function as the user input unit 724 which provides an input interface between the vehicle 700 and the user and also function to provide an output interface between the vehicle 700 and the user. In this case, the display unit 180 may include a touch sensor which detects a touch applied to the display unit 180 so as to receive a control command in a touch manner.

When a touch is input to the display unit 180 as described above, the touch sensor may detect the touch and the controller 770 may execute a control command corresponding to the touch. Contents input in a touch manner may be characters or numbers, or may be, for example, instructions in various modes or menu items that may be designated.

The touch sensor and the proximity sensor may be implemented individually, or in combination, to detect various types of touches such as a short (or tap) touch, a long touch, a multi-touch, a drag touch, a flick touch, a pinch-in touch, a pinch-out touch, a swipe touch, a hovering touch, and the like. Hereinafter, an input, a touch or a touch input may generally refer to various types of touches mentioned above. The input, touch or touch input may be mixed.

Referring to FIG. 8, the display unit 180c may display an image. The display unit 180c may be referred to as a cluster 180c. The cluster 180c may have a display area divided into a first display area 181, a second display area 182, and a third display area 183 to display an image therein. Each of the display areas 181, 182, and 183 may display different images.

The first display area 181 may display an image 181a related to a speed of the vehicle 700. For example, the first display area 181 may display a current speed of the vehicle 700, and a speed limit of a road on which the vehicle 700 is traveling.

The second display area 182 may display a navigation 182a. Alternatively, the second display area 182 may display a function related to autonomous driving of the vehicle 700. For example, the second display area 182 may display an advanced driver assistance system (ADAS) function which is active when the current vehicle 700 is traveling.

The third display area 183 may display information 183a and 183b related to power of the vehicle 700. For example, when the vehicle 700 is driven by an electric motor, the third display area 183 may display remaining power of the battery 790 of the vehicle 700 by a number 183a and a gauge 183b.

Referring to FIG. 9, the processor 170 may receive an input from the occupant 900 through the control board 200. The input of the occupant 900 may be made on an input surface 210. When the input of the occupant 900 is received, the processor 170 may change contents displayed in the display areas 181, 182, and 183 of the cluster 180c. For example, the processor 170 may display a state of a transmission, remaining power, or a distance to empty of the vehicle 700, as an image 182b, in the second display area 182. For example, the processor 170 may display the contents displayed in the third display area 183 of the cluster 180c as an image 183c near the vehicle 700. Alternatively, when an input of the occupant 900 is received, the processor 170 may activate the display areas 181, 182, and 183 of the cluster 180c. Here, the input of the occupant 900 may be a long touch applied to the input surface 210 for a long time. The processor 170 may control a specific area of the input surface 210 on which the input of the occupant 900 is received to correspond to a specific display area of the cluster 180c. For example, when the occupant 900 applies an input to a specific area of the input surface 210, the processor 170 may control the third display area 183 of the cluster 180c.

Referring to FIG. 10, the processor 170 may receive an input from the occupant 900 through the control board 200. The input of the occupant 900 may be made on the input surface 210. When the input of the occupant 900 is received, the processor 170 may change contents displayed in the display areas 181, 182, and 183 of the cluster 180c. For example, the processor 170 may display a temperature inside the vehicle 700 or a temperature outside the vehicle 700 in the third display area 182 as an image 183d. Here, the input of the occupant 900 may be dragging in a state of touching the input surface 210. The occupant 900 may drag a finger following a long touch applied to the input surface 210 for a long time. The processor 170 may change the display contents of the third display area 183 as the dragging of the occupant 900 proceeds.

Referring to FIG. 11, the processor 170 may receive an input from the occupant 900 through the control board 200. The input of the occupant 900 may be made on the input surface 210. When the input of the occupant 900 is received, the processor 170 may change contents displayed in the display areas 181, 182, and 183 of the cluster 180c. For example, the processor 170 may display a temperature inside the vehicle 700 in the third display area 182 as an image 183d. Here, the input of the occupant 900 may be a touch released while touching the input surface 210. The occupant 900 may drag the finger following a long touch applied to the input surface 210 for a long time, and may release the touch following the drag. When the touch of the occupant 900 is released, the processor 170 may display that the display contents of the third display area 183 that the image 183d indicating the temperature inside the vehicle 700 is selected. For example, the processor 170 may change a color of the selected image 183d, or may cause the image 183d to move slightly and return to its place, to inform the occupant 900 that the selection is completed.

Referring to FIG. 12, the processor 170 may receive an input from the occupant 900 through the control board 200. The input of the occupant 900 may be made on the input surface 210. After the image 180d is selected by the occupant 900, when an input of the occupant 900 is received, the processor 170 may change the contents displayed in the display areas 181, 182, and 183 of the cluster 180c. For example, the processor 170 may display a change in a set temperature inside the vehicle 700 in the third display area 182 as an image 183d. Here, the input of the occupant 900 may be dragging in a state of touching the input surface 210. The occupant 900 may drag on the input surface 210 to the right or left LR or up and down UD. The processor 170 may increase or decrease the set internal temperature value according to the dragging of the occupant 900. For example, if the occupant 900 drags in a state of touching the input surface 210 to the left L, the processor may lower the set temperature to 58 degrees Fahrenheit. Alternatively, if the occupant 900 drags in a state of touching the input surface 210 to the right R, the processor may raise the set temperature to 74 degrees Fahrenheit. Alternatively, if the occupant 900 drags to the lower side D, in a state of touching the input surface 210, the processor may lower the set temperature to 57 degrees Fahrenheit. Alternatively, if the occupant 900 drags to the upper side U, in a state of touching the input surface 210, the processor may raise set temperature to 75 degrees Fahrenheit.

Referring to FIG. 13, the processor 170 may receive an input from the occupant 900 through the control board 200. The input of the occupant 900 may be made on the input surface 210. When the input of the occupant 900 is received, the processor 170 may change the contents displayed in the display areas 181, 182 and 183 of the cluster 180c or change the contents displayed in the display area 185 of the CID 180b.

The processor 170 may control a specific area of the input surface 210 on which the input of the occupant 900 is received to correspond to a specific display area of the cluster 180c or a specific display area of the CID 180b. For example, when the occupant 900 applies an input to a specific area of the input surface 210, the processor 170 may selectively control the third display area 183 of the cluster 180c or the display area 185 of the CID 180b.

For example, the processor 170 may display a state of a transmission, remaining power, or a distance to empty of the vehicle 700, as an image 182b, in the second display area 182. For example, the processor 170 may display the contents displayed in the third display area 183 of the cluster 180c as the set temperature inside the vehicle 700. Alternatively, when an input of the occupant 900 is received, the processor 170 may activate the display areas 181, 182, and 183 of the cluster 180c. Here, the input of the occupant 900 may be a long touch applied to the input surface 210 for a long time. The processor 170 may control a specific area of the input surface 210 on which the input of the occupant 900 is received to correspond to a specific display area of the cluster 180c. For example, when the occupant 900 applies an input to a specific area of the input surface 210, the processor 170 may control the third display area 183 of the cluster 180c.

For example, the processor 170 may display an image 185a related to sound reproduction in the display area 185. Alternatively, when an input of the occupant 900 is received, the processor 170 may activate a display area 185 of the CID 180b. Here, the input of the occupant 900 may be a long touch applied to the input surface 210 for a long time. The processor 170 may control a specific area of the input surface 210 on which the input of the occupant 900 is received to correspond to a specific display area of the CID 180b. For example, when the occupant 900 applies an input to a specific area of the input surface 210, the processor 170 may control the display area 185 of the CID 180b.

Referring to FIG. 14, the processor 170 may detect whether there is an input from the occupant 900 through the control board 200. The processor 170 may determine whether a position of the input applied by the occupant 900 corresponds to the first display 180c. When it is determined that the position of the input applied by the occupant 900 corresponds to the first display 180c, the processor 170 may control a predetermined area in the first display 180c. When it is determined that the position of the input applied by the occupant 900 corresponds to the second display 180b, the processor 170 may control a predetermined area in second first display 180b.

Referring to FIG. 15, the control board 200 may display an image. The control board 200 may display an image button 213. The image button 213 may be used to turn on or off, activate, deactivate or adjust functions related to control of the vehicle 700. The control board 200 may include an area for displaying the image button 213 and an area 212 for controlling the displays 180b and 180c.

The processor 170 may change display of the image button according to an input of the occupant 900. For example, when the occupant 900 touches a specific area 211 and drags down, the processor 170 may expand or add the area 211 for displaying an image button. The processor 170 may further display an image button 211a in the expanded or added area 211. Here, the processor may reduce the area 212 for controlling the displays 180b and 180c.

The control board 200 may receive an input on the image buttons 211a and 213 from the occupant. The control board 200 may transmit the input information to the processor 170. When the input information is received from the control board 200, the processor 170 may activate a control function corresponding to the image buttons 211a and 213. For example, when the occupant touches "video" in the image button 211a, the processor 170 may reproduce an image through the display unit 180 of the vehicle 700.

Referring to FIG. 16, the processor 170 may change display of the image related to control of the vehicle 700 according to an input of the occupant 900. For example, when the occupant 900 touches an image button "Out" to view an external state of the vehicle 700, the control board 200 may display an image indicating an opening/closing state of a bonnet, a door, or a trunk door.

Referring to FIG. 17, the processor 170 may change display of the image related to control of the vehicle 700 according to an input of the occupant 900. For example, when the occupant 900 touches an image button represented by "In" to view a control state related to the inside of the vehicle 700, the control board 200 may display an image indicating an internal sound control state and image buttons 211m, 211n, and 211p capable of adjusting an internal sound state.

Referring to FIG. 18, the processor 170 may change display of the image related to control of the vehicle 700 according to an input of the occupant 900. For example, the control board 200 may display image buttons 211b, 211c, 211d, 211e, 211f, 211g, 211h, 211i, 211j, 211k, and 211m for controlling an air-conditioning system of the vehicle 700 in one area 211. The processor may dispose the area 212 for controlling the displays 180b and 180c below the area 211 where the image buttons 211b, 211c, 211d, 211e, 211f, 211g, 211h, 211i, 211j, 211k, and 211m are displayed.

Referring to FIG. 19, when there are inputs applied to the control board 200 from a plurality of occupants, the processor 170 may detect from which occupants the inputs are applied. The processor 170 may determine an occupant who applies an input to the control board 200 through the camera 160h that captures an image of the surroundings of the driver's seat S1, the passenger's seat S2 and the control board 200.

Although the driver 920 touches the image button, while controlling the display units 180, 180b and 180c through the control board 200, the processor 170 may determine the touch as an input for controlling the display units 180, 180b, and 180c and control the display units 180, 180b, and 180c. Alternatively, although the driver 920 touches the image button, while controlling the display units 180, 180b and 180c through the control board 200, the processor 170 may determine that the touch is not an input applied to the image button. Alternatively, although the driver 920 touches the image button, while controlling the display units 180, 180b and 180c through the control board 200, the processor 170 may disregard the input applied to the image button.

Although the driver 920 touches the image button 211d, while controlling the display units 180, 180b and 180c through the control board 200, the processor 170 may not activate a temperature setting function. Alternatively, although the driver 920 touches the image button 211d, while controlling the display units 180, 180b and 180c through the control board 200, the processor 170 may control the area 183 of the display units 180, 180b, and 180 corresponding to the position of the image button 211d.

When it is determined that there is an input applied to the image button through the control board 200 from a fellow occupant 910, the processor 170 may execute a vehicle control function corresponding to the image button.

For example, if the fellow occupant 910 touches the image button 211h, while the driver 920 is controlling the display unit 180, 180b, 180c via the control board 200, the processor 170 may execute an air-conditioner (AC) function.

Accordingly, when there are a plurality of inputs applied to the control board 200 from a plurality of occupants, the processor 170 may provide a control function corresponding to each occupant.

Referring to FIG. 20, the processor 170 may detect whether the driver 920 is controlling the display unit 180 through the control board 200 (S2210). The processor 170 may detect whether the driver 920 is controlling the display unit 180 through the control board 200 via the camera 160h.

The processor 170 may determine whether an input applied to the image button through the control board 200 is an input from the driver 920 (S2220).

When there is no input applied to the image button through the control board 200 from the driver 920, the processor 170 may control the display unit 180 (S2230).

When it is determined that an input applied to the image button through the control board 200 is an input applied from the driver 920, the processor 170 may determine that the input is to control the display unit 180, and control the display unit 180 (S2240). Alternatively, when it is determined that an input applied to the image button through the control board 200 is an input applied from the driver 920, the processor 170 may determine that the input is not an input applied to the image button. Alternatively, when it is determined that an input applied to the image button through the control board 200 is an input applied from the driver 920, the processor 170 may disregard the input applied to the image.

Referring to FIG. 21, the processor 170 may detect whether the driver 920 is controlling the display unit 180 through the control board 200 (S2310). The processor 170 may detect whether the driver 920 is controlling the display unit 180 through the control board 200 via the camera 160h.

The processor 170 may determine whether an input applied to the image button through the control board 200 is an input from the fellow occupant 910 (S2320).

When there is no input applied to the image button from the fellow occupant 910 through the control board 200, the processor 170 may control the display unit 180 on the basis of contents input from the driver 920 (S2330).

When it is determined that an input applied to the image button through the control board 200 is an input from the fellow occupant 910, the processor 170 may execute the vehicle control function corresponding to the image button (S2340).

Referring to FIG. 22, the processor 170 may receive an input from the driver 920 through the control board 200. The input of the driver 920 may be made on the input surface 210. When the input of the driver 920 is received, the processor 170 may change the contents displayed in the display areas 181, 182 and 183 of the cluster 180c or change the contents displayed in the display area 185 of the CID 180b.

The processor 170 may control a specific area of the input surface 210 on which the input of the driver 920 is received to correspond to a specific display area of the cluster 180c or a specific display area of the CID 180b. For example, when the driver 920 applies an input to a specific area of the input surface 210, the processor 170 may selectively control the third display area 183 of the cluster 180c or the display area 185 of the CID 180b.

The processor 170 may receive an input from the fellow occupant 910 via the control board 200. The input of the fellow occupant 910 may be made on the input surface 210. When the input of the occupant 900 is received, the processor 170 may change the contents displayed in the display area 185 of the CID 180b.

The processor 170 may cause the areas of the display units 180, 180b and 180c to be controlled differently according to whether a person which applies an input to the control board 200 is the driver 920 or the fellow occupant 910.

Referring to FIG. 23, the processor 170 may monitor a gaze of the occupant 900 through the camera 160h and receive an input from the occupant 900 through the control board 200. The processor 170 may determine the areas 181, 182, 183, and 185 to be controlled in the display units 180, 180b, and 180c on the basis of a result of monitoring the gaze of the occupant 900.

For example, when the occupant 900 looks at a specific area 183 or 185 and applies an input to the control board 200, the processor 170 may control display contents of area 183 or 185 that the occupant 900 looks at.

The present invention may include the following embodiments.

Embodiment 1: A control device includes: an interface unit physically connected to a display unit, a control board receiving an input of an occupant, and a camera capturing an image of an area of a body of the occupant and the surroundings of the control board; and a processor exchanging information with the control board, the display unit, and the camera through the interface unit, wherein if it is determined that the occupant is present in the driver's seat through the camera and a first input is received from the occupant through the control board, the processor controls the display unit to display a display area corresponding to a position to which the first input is input on the control board, and when the display area is displayed in the display unit and a second input is received from the occupant through the control board, the processor selects or controls contents displayed in the display area.

Embodiment 2: The control device of Embodiment 1, in which the first input includes a third input and a fourth input, and the processor activates the display area when the third input is received, and searches for the contents when the fourth input is received.

Embodiment 3: The control device of Embodiment 2, in which the third input is an input for touching the control board, the fourth input is an input dragged in a touch state after the third input is applied, and the processor controls the display unit to display the contents to be varied according to the drag.

Embodiment 4: The control device of Embodiment 1, in which the second input includes a fifth input and a sixth input, and the processor selects the contents when the fifth input is received, and controls the contents when the sixth input is received.

Embodiment 5: The control device of Embodiment 4, in which the fifth input is an input for releasing the touch in a state of contacting the control board, and the processor controls the display unit to display the selected contents when the touch is released.

Embodiment 6: The control device of Embodiment 1, in which the display unit includes a first display and a second display adjacent to each other, and the processor controls the display unit to display the display area on either the first display or the second display.

Embodiment 7: The control device of Embodiment 6, in which the first display is a cluster and the second display is a center information display (CID).

Embodiment 8: The control device of Embodiment 6, in which the camera further captures an image of an area of a body of a second occupant, and if a seventh input is received from the second occupant through the control board, the processor controls the display unit to display a second display area corresponding to a position to which the seventh input is applied on the control board.

Embodiment 9: The control device of Embodiment 8, in which if an eighth input is received from the second occupant via the control board, the processor selects or controls contents displayed in the second display area.

Embodiment 10: The control device of Embodiment 9, in which if inputs are simultaneously received from the occupant and the second occupant through the control board, the processor controls contents displayed in the display area according to the input of the occupant and controls contents displayed in the second display area according to the input of the second occupant.

Embodiment 11: The control device of Embodiment 1, in which the camera further captures an image of an area of the body of the second occupant, and when an input is received from the second occupant through the control board, the processor controls the control board to display an image button for executing a control function of the vehicle.

Embodiment 12: The control device of Embodiment 1, in which the control board displays an image button for executing a control function of the vehicle, and the processor does not execute the control function and controls the display area when the first input or the second input is received.

Embodiment 13: The control device of Embodiment 12, in which the camera further captures an image of an area of the body of the second occupant, and if an input applied to the image button is received from the second occupant, the processor executes the control function.

Embodiment 14: The control device of Embodiment 13, in which if an input of the occupant and an input of the second occupant applied to the image button are simultaneously received through the control board, the processor controls contents displayed in the display area according to the input of the occupant and executes the control function according to the input of the second occupant.

Embodiment 15: The control device of Embodiment 6, in which the camera detects a direction of a gaze of the occupant, the processor determines whether the gaze of the occupant is oriented to the second display through the camera, and if it is determined that the gaze of the occupant is oriented to the second display and the first input is received, the processor controls the display unit to display the display area on the second display.

Embodiment 16: The control device of Embodiment 6, in which the camera detects a direction of a gaze of the second occupant, the processor determines whether the gaze of the occupant is oriented to the first display through the camera, and if it is determined that the gaze of the second occupant is oriented to the first display and a ninth input is received from the second occupant through the control board, the processor controls the display unit to display a second display area corresponding to a position to which the ninth input is applied on the first display.

Embodiment 21: A control method includes: capturing an image of an area of a body of an occupant and the surrounding of a control board receiving an input of the occupant; determining whether the occupant is present in a driver's seat through the camera; determining that the occupant is present in the driver's seat and receiving a first input from the occupant through the control board; when the first input is received, displaying, on a display unit inside a vehicle, a display area corresponding to a position to which the first input is applied on the control board; receiving a second input from the occupant through the control board in a state in which the display area is displayed on the display unit; and when the second input is received, selecting or controlling contents displayed in the display area.

Embodiment 22: The control method of Embodiment 21, in which the first input includes a third input and a fourth input, the control method further includes: activating the display area when the third input is received; and searching for the contents when the fourth input is received.

Embodiment 23: The control method of Embodiment 22, in which the third input is an input for touching the control board, the fourth input is an input dragged in a touched state after the third input is applied, and the control method further includes: displaying, by the display unit, the contents to be varied according to the drag.

Embodiment 24: The control method of Embodiment 21, in which the second input includes a fifth input and a sixth input, and the control method further includes: selecting the contents if the fifth input is received; and controlling the contents if the sixth input is received.

Embodiment 25: The control method of Embodiment 24, in which the fifth input is an input for releasing the touch in a state of contacting the control board, and the control method further includes: displaying, by the display unit, the selected contents when the touch is released.

Embodiment 26: The control method of Embodiment 21, in which the display unit includes a first display and a second display adjacent to each other, and the control method further includes: controlling the first display or the second display to display the display area on either the first display or the second display.

Embodiment 27: The control method of Embodiment 26, in which the first display is a cluster and the second display is a center information display (CID).

Embodiment 28: The control method of Embodiment 26, further includes: further capturing an image of a region of the body of the second occupant through the camera; receiving a seventh input from the second occupant through the control board; and when the seventh input is received, displaying, on the second display, a second display area corresponding to a position to which the seventh input is applied on the control board.

Embodiment 29: The control method of Embodiment 28, further includes: receiving an eighth input form the second occupant; and when the eighth input is received, selecting or controlling contents displayed in the second display area.

Embodiment 30: The control method of Embodiment 29, further includes: simultaneously receiving inputs from the occupant and the second occupant through the control board; and when the inputs are simultaneously received from the occupant and the second occupant through the control board, controlling contents displayed in the display area according to the input of the occupant and controlling contents displayed in the second display area according to the input of the second occupant.

Embodiment 31: The control method of Embodiment 21, further includes: further capturing an image of an area of the body of the second occupant; receiving an input from the second occupant through the control board; and when the input is received from the second occupant, displaying an image button for executing the control function of the vehicle by the control board.

Embodiment 32: The control method of Embodiment 21, further includes: displaying an image button for executing the control function of the vehicle by the control board; receiving the first input or the second input; and when the first input or the second input is received, controlling the display area, without executing the control function.

Embodiment 33: The control method of Embodiment 22, further includes: further capturing an area of the body of the second occupant by the camera; receiving an input applied to the image button from the second occupant; and when the input applied to the image button is received from the second occupant, executing the control function.

Embodiment 34: The control method of Embodiment 23, further includes: simultaneously receiving an input of the occupant and an input of the second occupant applied to the image button through the control board; and when the input of the occupant and the input of the second occupant applied to the image button are simultaneously received through the control board, controlling contents displayed in the display area according to the input of the occupant and executing the control function according to the input of the second occupant.

Embodiment 35: The control method of Embodiment 26, further includes: detecting a direction of a gaze of the occupant through the camera; determining whether the gaze of the occupant is oriented to the second display through the camera; and if it is determined that the gaze of the occupant is oriented to the second display and receiving the first input; and when the first input is received, displaying the display area on the second display.

Embodiment 36: The control method of Embodiment 26, further includes: detecting a direction of a gaze of the second occupant through the camera; determining whether the gaze of the second occupant is oriented to the first display through the camera, and determining that the gaze of the second occupant is oriented to the first display and receiving a ninth input from the second occupant through the control board; and when the ninth input is received, displaying, on the first display, a second display area corresponding to a position to which the ninth input is applied on the control board.

The effects of the control device according to the present invention are as follows. According to at least one of the embodiments of the present invention, the control device assisting driving of a vehicle can be provided. According to at least one embodiment of the present invention, the control device capable of controlling a display unit according to an input of an occupant can be provided. According to at least one embodiment of the present invention, the control device capable of providing a control function suitable for each occupant when there are a plurality of inputs from a plurality of occupants can be provided. According to at least one embodiment of the present invention, the control device capable of controlling a vehicle on the basis of a gaze of an occupant and a touch input of an occupant can be provided.

The effects of the control method according to the present invention are as follows. According to at least one embodiment of the present invention, the method of assisting driving of a vehicle can be provided. According to at least one embodiment of the present invention, the control method for controlling a display unit according to an input of an occupant can be provided. According to at least one embodiment of the present invention, the control method capable of providing a control function suitable for each occupant when there are a plurality of inputs from a plurality of occupants can be provided. According to at least one embodiment of the present invention, the control method for controlling a vehicle on the basis of a gaze of an occupant and a touch input of the occupant can be provided.

The control device or the control method according to the embodiments described above may assist a driver in driving a vehicle. The control device or the control method according to the embodiments described above may assist a vehicle in performing autonomous driving or semi-autonomous driving.

The above described features, configurations, effects, and the like are included in at least one of the implementations of the present disclosure, and should not be limited to only one implementation. In addition, the features, configurations, effects, and the like as illustrated in each implementation may be implemented with regard to other implementations as they are combined with one another or modified by those skilled in the art. Thus, contents related to these combinations and modifications should be construed as being included in the scope of the accompanying claims.

Further, although the implementations have been mainly described until now, they are just exemplary and do not limit the present disclosure. Thus, those skilled in the art will understand that various modifications and applications which have not been exemplified may be carried out within a range which does not deviate from the essential characteristics of the implementations. For instance, the constituent elements described in detail in the exemplary implementations may be modified to be carried out. Further, the differences related to such modifications and applications shall be construed to be included in the scope of the present disclosure specified in the attached claims.

The invention claimed is:

1. A control device comprising:
an interface unit physically connected to a display unit, a control board receiving an input of an occupant, and a camera capturing an image of an area of a body of the occupant and the surroundings of the control board; and
a processor exchanging information with the control board, the display unit; and the camera through the interface unit,
wherein if it is determined that the occupant is present in the driver's seat through the camera and a first input is received from the occupant through the control board, the processor controls the display unit to display a display area corresponding to a position to which the first input is input on the control board, and when the display area is displayed in the display unit and a second input is received from the occupant through the control board, the processor selects or controls contents displayed in the display area, and
wherein the first input includes a third input and a fourth input, and the processor activates the display area when the third input corresponding to touching the control board is received, and controls the display unit to change contents to be displayed while the fourth input corresponding to dragging in a touch state after the third input is applied and received.

2. The control device of claim 1, wherein
the second input includes a fifth input and a sixth input, and
the processor selects the contents when the fifth input is received, and controls the contents when the sixth input is received.

3. The control device of claim 2, wherein
the fifth input is an input for releasing the touch in a state of contacting the control board, and
the processor controls the display unit to display the selected contents when the touch is released.

4. The control device of claim 1, wherein
the display unit includes a first display and a second display adjacent to each other, and the processor controls the display unit to display the display area on either the first display or the second display.

5. The control device of claim 4, wherein
the first display is a cluster and the second display is a center information display (CID).

6. The control device of claim 4, wherein
the camera further captures an image of an area of a body of a second occupant, and
if a seventh input is received from the second occupant through the control board, the processor controls the display unit to display a second display area corresponding to a position to which the seventh input is applied on the control board.

7. The control device of claim 6, wherein
if an eighth input is received from the second occupant via the control board, the processor selects or controls contents displayed in the second display area.

8. The control device of claim 7, wherein
if inputs are simultaneously received from the occupant and the second occupant through the control board, the processor controls contents displayed in the display area according to the input of the occupant and controls contents displayed in the second display area according to the input of the second occupant.

9. The control device of claim 1, wherein
the camera further captures an image of an area of the body of the second occupant, and
when an input is received from the second occupant through the control board, the processor controls the control board to display an image button for executing a control function of the vehicle.

10. The control device of claim 1, wherein
the control board displays an image button for executing a control function of the vehicle, and
the processor does not execute the control function and controls the display area when the first input or the second input is received.

11. The control device of claim 10, wherein
the camera further captures an image of an area of the body of the second occupant, and
if an input applied to the image button is received from the second occupant, the processor executes the control function.

12. The control device of claim 11, wherein
if an input of the occupant and an input of the second occupant applied to the image button are simultaneously received through the control board,
the processor controls contents displayed in the display area according to the input of the occupant and executes the control function according to the input of the second occupant.

13. The control device of claim 4, wherein
the camera detects a direction of a gaze of the occupant,
the processor determines whether the gaze of the occupant is oriented to the second display through the camera, and
if it is determined that the gaze of the occupant is oriented to the second display and the first input is received, the processor controls the display unit to display the display area on the second display.

14. The control device of claim 4, wherein
the camera detects a direction of a gaze of the second occupant,
the processor determines whether the gaze of the second occupant is oriented to the first display through the camera, and
if it is determined that the gaze of the second occupant is oriented to the first display and a ninth input is received from the second occupant through the control board, the processor controls the display unit to display, on the first display; a second display area corresponding to a position to which the ninth input is applied on the control board.

15. A control method comprising:
capturing an image of an area of a body of an occupant and the surrounding of a control board receiving an input of the occupant;
determining whether the occupant is present in a driver's seat through the camera;
determining that the occupant is present in the driver's seat and receiving a first input from the occupant through the control board;
when the first input is received, displaying, on a display unit inside a vehicle, a display area corresponding to a position to which the first input is applied on the control board;
receiving a second input from the occupant through the control board in a state in which the display area is displayed on the display unit; and
when the second input is received, selecting or controlling contents displayed in the display area,
wherein the first input includes a third input and a fourth input, and the displaying includes:
activating the display area when the third input corresponding to touching the control board is received, and
changing contents to be displayed on the display unit while the fourth input corresponding to dragging in a touch state after the third input is applied and received.

16. The control method of claim 15, wherein
the second input includes a fifth input and a sixth input,
wherein the control method further comprising:
selecting the contents if the fifth input is received; and
controlling the contents if the fifth input is received.

17. A control device comprising:
an interface unit physically connected to a display unit, a control board receiving an input of an occupant, and a camera capturing an image of an area of a body of the occupant and the surroundings of the control board; and
a processor exchanging information with the control board, the display unit, and the camera through the interface unit,
wherein if it is determined that the occupant is present in the driver's seat through the camera and a first input is received from the occupant through the control board, the processor controls the display unit to display a display area corresponding to a position to which the first input is input on the control board, and when the display area is displayed in the display unit and a second input is received from the occupant through the control board, the processor selects or controls contents displayed in the display area,
wherein the display unit includes a first display and a second display adjacent to each other, and the processor controls the display unit to display the display area on either the first display or the second display, and
wherein the camera detects a direction of a gaze of the occupant, the processor determines whether the gaze of the occupant is oriented to the second display through the camera, and if it is determined that the gaze of the occupant is oriented to the second display and the first input is received, the processor controls the display unit to display the display area on the second display.

* * * * *